(12) United States Patent
Li et al.

(10) Patent No.: US 11,137,899 B2
(45) Date of Patent: Oct. 5, 2021

(54) LIQUID CRYSTAL WRITING FILM, PARTIAL ERASING METHOD, MULTI-VOLTAGE OUTPUT CIRCUIT AND POSITIONING SYSTEM CAPABLE OF PARTIAL ERASING

(71) Applicant: SHANDONG LANBEISITE EDUCATIONAL EQUIPMENT GROUP, Shandong (CN)

(72) Inventors: Qingbo Li, Jinan (CN); Xinli Shi, Jinan (CN)

(73) Assignee: SHANDONG LANBEISITE EDUCATIONAL EQUIPMENT GROUP, Jinan (CN)

( * ) Notice: Subject to any disclaimer, the term of this patent is extended or adjusted under 35 U.S.C. 154(b) by 0 days.

(21) Appl. No.: 16/492,689

(22) PCT Filed: Jan. 10, 2019

(86) PCT No.: PCT/CN2019/071227
§ 371 (c)(1),
(2) Date: Sep. 10, 2019

(87) PCT Pub. No.: WO2019/227942
PCT Pub. Date: Dec. 5, 2019

(65) Prior Publication Data
US 2020/0142581 A1    May 7, 2020

(30) Foreign Application Priority Data

May 30, 2018  (CN) .......................... 201810541474.5
May 30, 2018  (CN) .......................... 201810541991.2
(Continued)

(51) Int. Cl.
*G06F 3/0488*    (2013.01)
*G06F 3/041*     (2006.01)
(Continued)

(52) U.S. Cl.
CPC ...... *G06F 3/04883* (2013.01); *G02F 1/13306* (2013.01); *G02F 1/13338* (2013.01);
(Continued)

(58) Field of Classification Search
CPC ......... G09G 2370/16; G09G 2310/061; G09G 2354/00; G09G 3/3644; G09G 3/3629;
(Continued)

(56) References Cited

U.S. PATENT DOCUMENTS

2016/0091745 A1* 3/2016 Braganza .................. B43L 1/12
                                                        349/12
2018/0143475 A1* 5/2018 Li ........................ G02F 1/13338

FOREIGN PATENT DOCUMENTS

CN    107820582 A    3/2018
CN    107844218 A    3/2018
(Continued)

OTHER PUBLICATIONS

Apr. 10, 2019 Search Report issued in International Patent Application No. PCT/CN2019/071227.
(Continued)

*Primary Examiner* — Abhishek Sarma
(74) *Attorney, Agent, or Firm* — Oliff PLC

(57) ABSTRACT

A liquid crystal writing film includes: a first conductive layer, a liquid crystal layer and a second conductive layer, which are arranged in sequence. At least one of the first conductive layer and the second conductive layer is divided into two or more conductive regions that are insulated from each other; and the positioning of a to-be-erased region is achieved by the positioning system, a set voltage is applied to the set conductive region, and the voltage forms a set electric field in the to-be-erased region to erase the to-be-erased region. According to the present invention, the partial erasing of the liquid crystal writing film can be realized by (Continued)

using a local electric field formed between two upper and lower conductive layers, the erasing speed is high, a partial erasing region can be accurately positioned, and meanwhile the storage and reproduction of a writing trajectory can be achieved.

6 Claims, 9 Drawing Sheets

(30) Foreign Application Priority Data

| Jun. 11, 2018 | (CN) | 201810595466.9 |
|---|---|---|
| Jun. 15, 2018 | (CN) | 201810621598.4 |
| Jun. 26, 2018 | (CN) | 201810668960.3 |
| Jun. 26, 2018 | (CN) | 201810668965.6 |
| Jun. 26, 2018 | (CN) | 201810670294.7 |
| Jun. 26, 2018 | (CN) | 201810670787.0 |
| Jun. 26, 2018 | (CN) | 201810671632.9 |
| Nov. 30, 2018 | (CN) | 201811455640.6 |

(51) Int. Cl.
*G02F 1/133* (2006.01)
*G02F 1/1333* (2006.01)
*G02F 1/1343* (2006.01)
*G06F 3/038* (2013.01)

(52) U.S. Cl.
CPC ...... *G02F 1/134336* (2013.01); *G06F 3/0383* (2013.01); *G06F 3/04162* (2019.05); *G06F 2203/04106* (2013.01)

(58) Field of Classification Search
CPC ............. G06F 3/04883; G06F 3/04162; G06F 3/0383; G06F 2203/04106; G06F 3/0421; G06F 3/0445; G02F 1/13306; G02F 1/13338; G02F 1/134336
See application file for complete search history.

(56) References Cited

FOREIGN PATENT DOCUMENTS

| CN | 207529068 U | 6/2018 |
|---|---|---|
| CN | 108549169 A | 9/2018 |
| CN | 108563049 A | 9/2018 |
| CN | 108828821 A | 11/2018 |
| CN | 208207773 U | 12/2018 |
| CN | 208351191 U | 1/2019 |

OTHER PUBLICATIONS

Apr. 10, 2019 Written Opinion issued in International Patent Application No. PCT/CN2019/071227.

* cited by examiner

PWM1-1 and pwm1     Voltages output in two paths     Merged output VIN1(solid line)

LIQUID CRYSTAL WRITING FILM, PARTIAL ERASING METHOD, MULTI-VOLTAGE OUTPUT CIRCUIT AND POSITIONING SYSTEM CAPABLE OF PARTIAL ERASING

FIELD OF THE INVENTION

The present disclosure relates to the field of liquid crystal writing film technology, and in particular to a liquid crystal writing film, a partial erasing method, a multi-voltage output circuit, and a positioning system capable of achieving partial erasing.

BACKGROUND OF THE INVENTION

A liquid crystal writing film described in the present patent has obvious differences from a common liquid crystal display film and a plasma display film in aspects of liquid crystal components, working principles, applied ranges, use manners, etc., and especially in the writing aspect, and neither the common liquid crystal display film nor the plasma display film can achieve indentation writing and erase traces.

The working principle of the liquid crystal writing film on the market at present is to display and/or erase writing contents on a liquid crystal writing board by using the bistable characteristics of the liquid crystal. For example, a cholesteric liquid crystal is used as a writing film, a writing pressure trajectory of a writing pen is recorded by pressure acting on the liquid crystal writing board so as to display the corresponding writing contents; and the orientation of the cholesteric liquid crystal is changed by applying an electric field, so that the writing pressure trajectory on the liquid crystal writing board disappears to achieve erasure.

During handwriting erasing, the existing product adopting the liquid crystal writing film can only erase all handwriting in the entire liquid crystal writing board in a power-on manner, for example, when a user only needs to erase a part of the handwriting, the requirement cannot be satisfied in the existing manner that the entire board is powered on, and particularly when a handwriting part with errors is modified, the existing overall erasing manner will cause loss of the remaining information that does not need to be modified, and how to use the power-on manner to realize fast erasing of a partial region with better experience has become a problem to be solved by the user urgently.

The liquid crystal writing film voltage control circuit and control method disclosed by the prior art can only provide a single voltage for conductive layers, and a writing region is wholly erased by using an electric field formed between the two conductive layers. Such a voltage control method cannot realize voltage application to different conductive regions, and cannot form effective voltage control for different partial erasure regions, and the purpose of partial erasure cannot be achieved. At the same time, the existing liquid crystal writing film voltage control circuit generally adopts a single-channel boosting mode, so that the output voltage value fluctuates greatly, which is not conducive to a stable voltage.

During the partial erasing of the liquid crystal writing film, the problem that must be faced is to position a partial erasing location, and partial erasing of the liquid crystal writing film is positioned by simulating the manner of wiping a blackboard, so that better user experience can be brought. The prior art discloses a partial region which is identified in a thermal erasing manner, but this manner is complicated in operation and low in safety factor, likely causes damage to the writing film and thus brings poor user experience. The prior art discloses that the partial erasing is performed by pressing part of the liquid crystal writing film in an eraser manner by applying a certain pressure, but this manner has the defects that the erasing speed is low, residual traces are left after the erasing, the effect is not satisfactory, and the writing film surface is easily damaged, so that the user experience is poor.

SUMMARY OF THE INVENTION

In order to solve the above problems, a liquid crystal writing film capable of achieving partial erasing, a partial erasing method, a multi-voltage output circuit, and a positioning system are disclosed. The partial erasing of the liquid crystal writing film can be realized at a high erasing speed by using a local electric field formed between two upper and lower conductive layers, a partial erasing region can be accurately positioned, and meanwhile the storage and reproduction of a writing trajectory can be achieved.

In order to achieve the above objective, the present disclosure adopts the following technical solutions:

A liquid crystal writing film capable of achieving partial erasing disclosed in one or more embodiments includes:

a first conductive layer, a liquid crystal layer and a second conductive layer, which are arranged in sequence;

one of the first conductive layer and the second conductive layer is divided into two or more conductive regions that are insulated from each other; and a common overlapping part of the conductive regions, the liquid crystal layer and the undivided conductive layer is an erasable region;

or, the first conductive layer and the second conductive layer are both divided into two or more conductive regions that are insulated from each other; and a spatial overlapping part of the conductive regions of the first conductive layer and the second conductive layer forms the erasable region with a liquid crystal layer region corresponding to the part together.

Further, the conductive layer is divided into two or more strip-shaped conductive regions that are insulated from each other by an etching line;

further, the line width of the etching line is not more than 1 mm; and furthermore, the line width of the etching line is between 10 μm and 200 μm.

Further, the conductive regions on the same conductive layer have the same width; and further, the width of the conductive region is 1 mm to 15 mm.

Further, the conductive region should at least include a part of an edge of the conductive layer to which it belongs.

Further, when the first conductive layer and the second conductive layer are both divided, the conductive regions of the first conductive layer are distributed parallel to each other along a first direction; the conductive regions of the second conductive layer are distributed parallel to each other along a second direction; and the first direction and the second direction are spatially interlaced with each other; and further, the first direction is vertical to the second direction.

Further, at least one of the first conductive layer and the second conductive layer is arranged on a substrate layer.

Further, an insulating layer is arranged between at least one of the first conductive layer and the second conductive layer and the liquid crystal layer.

A partial erasing method of a liquid crystal writing film disclosed in one or more embodiments includes the above-mentioned liquid crystal writing film capable of achieving partial erasing;

when one of the first conductive layer and the second conductive layer is divided, a voltage A is applied to the conductive region of the divided conductive layer that covers the partial erasing region; a voltage B is applied to the other conductive layer; the voltage A and the voltage B form an erasing electric field at a spatial overlapping location between the conductive region of the divided conductive layer that covers the partial erasing region and the other conductive layer, so as to achieve the partial erasing; and when the first conductive layer and the second conductive layer are both divided, the voltage A is applied to the conductive region of the first conductive layer that covers the partial erasing region; the voltage B is applied to the conductive region of the second conductive layer that covers the partial erasing region; and the voltage A and the voltage B form the erasing electric field at the spatial overlapping location between the conductive regions, so as to achieve the partial erasing.

Further, an absolute value of a difference value between the voltage A and the voltage B is greater than zero.

Further, when the first conductive layer and the second conductive layer are both divided, a compensation voltage is applied to the conductive region set at the outside of the respective conductive regions of the two conductive layers that cover the partial erasing regions, so that the electric field formed by the voltage difference between the conductive regions set at the outside of the partial erasing regions on the two conductive layers cannot cause disappearance of liquid crystal indentation.

Further, a voltage C is applied to the conductive regions set at the outside of the respective conductive regions of the two conductive layers that cover the partial erasing regions, and with the voltage B as a reference value, the voltage A, the voltage B and the voltage C satisfy the following relationship:

$|(\text{voltage } A - \text{voltage } B| > |\text{voltage } A - \text{voltage } C|$ $|(\text{voltage } A - \text{voltage } B| > |\text{voltage } C - \text{voltage } B|;$ further, $|(\text{voltage } A - \text{voltage } B| = |\text{voltage } C - \text{voltage } B|*2.$ Further, when the first conductive layer and the second conductive layer are both divided, two or more compensation voltages are applied to the conductive regions set at the outside of the respective conductive regions of the two conductive layers that cover the partial erasing regions, so that the electric field formed by the voltage difference between the conductive regions set at the outside of the partial erasing regions on the two conductive layers cannot cause shallowness or disappearance of the liquid crystal indentation visible to naked eyes.

Further, a voltage D is applied to the conductive region set at the outside of the conductive region on the first conductive layer that covers the partial erasing region, and a voltage E is applied to the conductive region set at the outside of the conductive region on the second conductive layer that covers the partial erasing region; and with the voltage B as a reference value, the voltage A, the voltage B, the voltage D and the voltage E satisfy the following relationship:

$|\text{voltage } A - \text{voltage } B| > |\text{voltage } D - \text{voltage}|$ $|\text{voltage } A - \text{voltage } B| > |\text{voltage } A - \text{voltage } E|$ $|\text{voltage } A - \text{voltage } B| > |\text{voltage } D - \text{voltage } E|$ further, $|\text{voltage } A - \text{voltage } B| = |\text{voltage } D - \text{voltage } B|*3$ $|\text{voltage } E - \text{voltage } B| = |\text{voltage } D - \text{voltage } B|*2.$ A multi-voltage output circuit for implementing a partial erasing method of a liquid crystal writing film disclosed in one or more embodiments includes: a main controller and a booster circuit, wherein the main controller generates a control signal; the booster circuit generates a corresponding voltage required to erase the indentation according to the control signal generated by the main controller, wherein the booster circuit outputs two or more voltages required to erase the indentation, and an erasing electric field is formed by a relative voltage difference formed by the two or more voltages required to erase the indentation, so as to erase the indentation.

Further, the booster circuit includes one or more voltage generation units, and the voltage generation unit includes one or more inductive booster circuits; and an input end of each inductive booster circuit receives the control signal of the main controller, and an output end outputs a required voltage; and further, two inductive booster circuits are provided, the input end of each inductive booster circuit receives the control signal of the main controller, and the output ends of the two inductive booster circuits are superimposed to output a required voltage signal.

Further, the voltage generation unit includes two inductive booster circuits, the specific structure of which is as follows:

a base of a triode Q1 is connected with a resistor R2 in series, a collector of the triode Q1 is connected with a tap of an inductor L2, and an emitter of the triode Q1 is grounded; one end of the inductor L2 is connected with a power supply, the other end is connected with a positive electrode of a diode D2, and a negative electrode of the diode D2 is sequentially connected with a resistor R1 and a resistor R4 in series and then is grounded; a polar capacitor E1 and a capacitor C2 are respectively connected to both ends of a serial branch of the resistor R1 and the resistor R4 in parallel, the positive electrode of the polar capacitor E1 is connected with the negative electrode of the diode D2, and the other end is grounded; and one end of the capacitor C2 is connected with the negative electrode of the diode D2, and the other end is grounded; and the negative electrode of the diode D2 is connected with the negative electrode of a diode D1, the positive electrode of the diode D1 is connected with one end of an inductor L1, and the other end of the inductor L1 is connected with the power supply, the base of a triode Q2 is connected with a resistor R3, the collector of the triode Q2 is connected with the tap of the inductor L1, and the emitter of the triode Q2 is grounded.

Further, the output end voltage of the voltage generation unit is input to the main controller after being divided, and the main controller adjusts the output of the control signal in real time according to the received voltage, so that the output end voltage of the voltage generation unit is stable.

Further, the control signal output by the main controller is a PWM signal.

A partial erasing method of a liquid crystal writing film disclosed in one or more embodiments includes the above-mentioned liquid crystal writing film capable of achieving partial erasing; wherein the first conductive layer and the second conductive layer are respectively divided into two or more conductive regions; a first voltage is applied to the conductive region of the first conductive layer that covers the partial erasing region; a second voltage is applied to the conductive region of the second conductive layer that covers the partial erasing region; the remaining conductive regions are in a high impedance state; and the first voltage and the second voltage form an erasing electric field at a spatial overlapping location of the two conductive regions so as to achieve the partial erasing.

A partial erasing method of a liquid crystal writing film disclosed in one or more embodiments includes the above-mentioned liquid crystal writing film capable of achieving partial erasing; wherein the first conductive layer and the second conductive layer are respectively divided into two or more conductive regions; a first voltage is applied to the conductive region of the first conductive layer that covers a first partial erasing region; a second voltage is applied to the conductive region of the second conductive layer that covers the first partial erasing region; the second voltage is applied to the conductive region of the first conductive layer that covers a second partial erasing region; the first voltage is applied to the conductive region of the second conductive layer that covers the second partial erasing region; the remaining conductive regions are in a high impedance state; and the first partial erasing region and the second partial erasing region are diagonally adjacent to each other; and the first voltage and the second voltage form an erasing electric field at a spatial overlapping location of the conductive regions on the two conductive layers so as to achieve the partial erasing of the diagonal adjacent regions.

Further, the conductive region is connected with a multi-voltage output circuit, and the multi-voltage output circuit can apply the first voltage, the second voltage or the high impedance state to the conductive region as needed; and further, the first voltage is at least greater than the voltage required to completely erase the handwriting, and the second voltage is a zero voltage.

A partial erasing electromagnetic positioning system disclosed in one or more embodiments includes the above-mentioned liquid crystal writing film and a main controller, at least one of the first conductive layer and the second conductive layer is divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other; and the first group of conductive regions is used as signal receiving regions, each two adjacent conductive regions in the first group are configured as closed loops for receiving external electromagnetic signals, the closed loops are connected with the main controller, and the main controller converts the received electromagnetic signals into positioning signals; the second group of conductive regions is as erasing regions.

Further, when the two conductive layers are both divided, the first group of conductive regions on the first conductive layer have the same width, and the second group of conductive regions have the same width; the first group of conductive regions on the second conductive layer have the same width, and the second group of conductive regions have the same width; and further, the width of the first group of conductive regions on the first conductive layer is the same as the width of the first group of conductive regions on the second conductive layer.

A partial erasing electromagnetic positioning system disclosed in one or more embodiments includes the above-mentioned liquid crystal writing film, a main controller and a conductive mesh, the conductive mesh is arranged on the back face of the liquid crystal writing film, the conductive mesh includes a plurality of conducting wires, each two adjacent conducting wires can be configured as closed loops for receiving external electromagnetic signals, the closed loops are connected with the main controller, and the main controller converts the received electromagnetic signals into positioning signals.

Further, the conductive mesh includes a group of conducting wires on a first direction and a group of conducting wires on a second direction, and the two groups of conducting wires are insulated from each other and take the shape of a crossed mesh in the space; and further, the conductive mesh is woven by conducting wires.

A partial erasing electromagnetic positioning system disclosed in one or more embodiments includes the above-mentioned liquid crystal writing film, a main controller and a conductive film, and the conductive film is arranged on the front face or the back face of the liquid crystal writing film;

the conductive film includes a first conductive layer and a second conductive layer;

the first conductive layer or the second conductive layer is divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other; and the first group of conductive regions is used as signal receiving regions, each two adjacent conductive regions in the first group are configured as closed loops for receiving external electromagnetic signals, the closed loops are connected with the main controller, and the main controller converts the received electromagnetic signals into positioning signals.

A partial erasing electromagnetic positioning system disclosed in one or more embodiments includes the above-mentioned liquid crystal writing film, a main controller and a conductive film, and the conductive film is arranged on the front face or back face of the liquid crystal writing film;

the conductive film is divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other; and the first group of conductive regions is used as signal receiving regions, each two adjacent conductive regions in the first group are configured as closed loops for receiving external electromagnetic signals, the closed loops are connected with the main controller, and the main controller converts the received electromagnetic signals into positioning signals.

A working method based on the above-mentioned positioning system disclosed in one or more embodiments includes: turning on different closed loops at intervals, performing polling, when a certain closed loop receives an electromagnetic signal and generates induced current, and converting, by the main controller, the induced current into a positioning signal to achieve primary positioning; and continuously turning on the closed loops for positioning within a primary positioning region set range in sequence to perform accurate positioning.

A working method based on the above-mentioned positioning system disclosed in one or more embodiments includes: continuously turning on the closed loops in sequence, and continuously performing traversing so as to perform positioning.

Further, the system further includes: a writing end and a storage unit and/or a transmission unit;

an electromagnetic signal transmitting unit is arranged on the writing end;

the closed loop receives the electromagnetic signal emitted by the electromagnetic signal transmitting unit and generates induced current, and the main controller converts the induced current into a positioning signal of a writing trajectory; and the storage unit records the positioning signal of the writing trajectory and/or the transmission unit transmits the positioning signal of the writing trajectory.

Further, the positioning signal of the writing trajectory is transmitted to the storage unit, the storage unit is arranged in the writing end or in a device where the liquid crystal writing film is located, and data is transmitted to a user terminal through a corresponding interface; or the positioning signal of the writing trajectory is transmitted to the cloud through the transmission unit, and the user terminal checks the data by accessing the cloud.

Further, the system further includes: a writing end and a storage unit and/or a transmission unit;

an electromagnetic signal transmitting unit, a pressure sensor and a pressure signal transmission unit are arranged on the writing end;

the closed loop receives the electromagnetic signal emitted by the electromagnetic signal transmitting unit and generates induced current, and the main controller converts the induced current into a positioning signal of a writing trajectory;

the pressure sensor detects a writing pressure signal and transmits the pressure signal to a pressure signal receiving unit; and the data received by the pressure signal receiving unit and the positioning signal of the writing trajectory are recorded and stored by the storage unit and/or the transmission unit.

Further, the positioning signal of the writing trajectory is transmitted to the storage unit, the storage unit is arranged in the writing end or in a device where the liquid crystal writing film is located, and data is transmitted to a user terminal through a corresponding interface; or the positioning signal of the writing trajectory is transmitted to the cloud through the transmission unit, and the user terminal checks the data by accessing the cloud.

A partial erasing ultrasonic positioning system disclosed in one or more embodiments includes: the above-mentioned liquid crystal writing film and at least one ultrasonic transmitting device arranged on an erasing object; at least two ultrasonic receiving devices are arranged on an edge or at the surrounding of the liquid crystal writing film; and partial erasing location information is positioned by a signal transmission distance between the ultrasonic transmitting device and the ultrasonic receiving device.

A partial erasing infrared positioning system disclosed in one or more embodiments includes: the above-mentioned liquid crystal writing film, an infrared transmitting tube array and an infrared receiving tube array are respectively arranged around the liquid crystal writing film along a first direction; and an infrared transmitting tube array and an infrared receiving tube array are respectively arranged around the liquid crystal writing film along a second direction;

the relative location information of an obstacle on the liquid crystal writing film is determined according to a relative location of infrared receiving tubes that do not receive infrared signals;

further, the first direction is vertical to the second direction; and further, whether the size and/or shape of the obstacle satisfies the set requirements of partial erasing is judged, and if yes, partial erasing is performed; or otherwise, the partial erasing is not performed.

A partial erasing infrared positioning system disclosed in one or more embodiments includes: the above-mentioned liquid crystal writing film, an infrared transmitting tube array and an infrared receiving tube array are respectively arranged around the liquid crystal writing film along a set direction; and the infrared transmitting tube array and the infrared receiving tube array respectively work in a direct receiving mode and an oblique receiving mode at a set angle;

the relative location information of an obstacle on the liquid crystal writing film is determined according to a relative location of an infrared receiving tube that does not receive an infrared signal and a corresponding infrared transmitting tube by using a geometrical relationship; and further, whether the size and/or shape of the obstacle satisfies the set requirements of partial erasing is judged, and if yes, partial erasing is performed; or otherwise, the partial erasing is not performed.

A partial erasing image positioning system disclosed in one or more embodiments includes: the above-mentioned liquid crystal writing film and at least one image positioning device, and the image positioning device includes at least one camera and a processor connected with the camera; the camera collects image information of an erasing object appearing in a writing region and transmits the image information to the processor, and the processor positions a relative location of the erasing object on the liquid crystal writing film according to the image information, and determines partial erasing location information; and further, whether the size and/or shape of the obstacle satisfies the set requirements of partial erasing is judged, and if yes, partial erasing is performed; or otherwise, the partial erasing is not performed.

Compared with the prior art, the beneficial effects of the present disclosure are as follows:

At least one conductive layer of the liquid crystal writing film is divided to form the conductive regions that are insulated from each other, and the erasing electric field is formed by controlling the voltages of the conductive regions, which can realize partial region erasing of writing contents without affecting the other regions by the erasing, so that the defect that only complete erasing can be realized by the traditional technology is overcome, the working efficiency of users and the user experience are improved, and the commercial values of the liquid crystal writing film and its application equipment are improved.

Mutual insulation between the conductive regions is realized by an etching process, thereby having the advantages of low cost, no pollution, easy operation, high yield, diversified etching patterns, etc.

The multi-voltage output circuit outputs two or more voltages to form the required erasing electric field in a to-be-erased region of the liquid crystal writing film; and at least two voltages are superposed and complemented in a manner of at least dual boosting to obtain the partial erasing voltage required to finally erase the indentation, and the shortcoming of instable output voltage caused by single boosting can be compensated.

In a partial erasing voltage application method designed by the present disclosure, during the erasing of a single region, only three forms of output need to be provided, that is, the erasing voltage, the zero voltage and the high impedance state, thereby greatly reducing the complexity of a voltage output circuit. Further, simultaneous erasing of two regions connected diagonally can be achieved to achieve fast erasing on an oblique line direction. The voltage is only provided for the conductive region where the erasing region is located, and the remaining conductive regions except the conductive region where the erasing region is located are in the high impedance state and cannot provide charge and discharge current; and compared with the manner of achieving the partial erasing by adopting an auxiliary voltage, the handwriting display of the surrounding regions is not affected, the writing delay phenomenon after the erasing is completed is obviously improved, and the user experience is improved.

On the basis of achieving the partial erasing, no external component needing to occupy the writing space needs to be added, and a writing member or/and an erasing member can be effectively positioned by using the electromagnetic principle in the case that the user experience is relatively good and even not affected. Through different optimization solutions, it can be ensured that the induced current can be generated when an object with magnetism or electromagnetic wave signals approaches, and the approximately or more precise location of the object on the writing film can be formed through the generation location and strength of the induced current, so as to achieve positioning.

At the same time, a variety of different partial erasing positioning methods such as ultrasonic positioning, infrared positioning and image positioning are designed, and the partial erasing positioning of the liquid crystal writing film is realized by simulating the manner of wiping a blackboard, so that better user experience can be brought.

After the positioning is realized, the writing trajectory can be stored to form historical handwriting, the written contents can be found in time, and meanwhile, remote viewing of the written contents can be realized. The writing end is provided with the pressure sensor, if the pressure is large, the handwriting is thick, and if the pressure is small, the handwriting is thin, so that the thickness of the writing trajectory can be detected to form the handwriting.

The fields to which the technology of the present disclosure can be applied include: writing boards, light energy writing boards, light energy liquid crystal writing boards, light energy large liquid crystal writing blackboards, light energy dustless writing boards, light energy portable blackboards, electronic drawing boards, liquid crystal display (LCD) electronic writing boards, electronic handwriting boards, electronic note notebooks, graffiti boards, kids handwriting boards, kids graffiti drawing boards, eraser function sketching boards, liquid crystal electronic drawing boards, color liquid crystal handwriting boards, etc.

BRIEF DESCRIPTION OF THE DRAWINGS

The drawings constituting a part of the present application are used for providing a further understanding of the present application, and illustrative embodiments of the present application and the explanations thereof are used for interpreting the present application, and do not constitute undue limits to the present disclosure.

Figure 1:
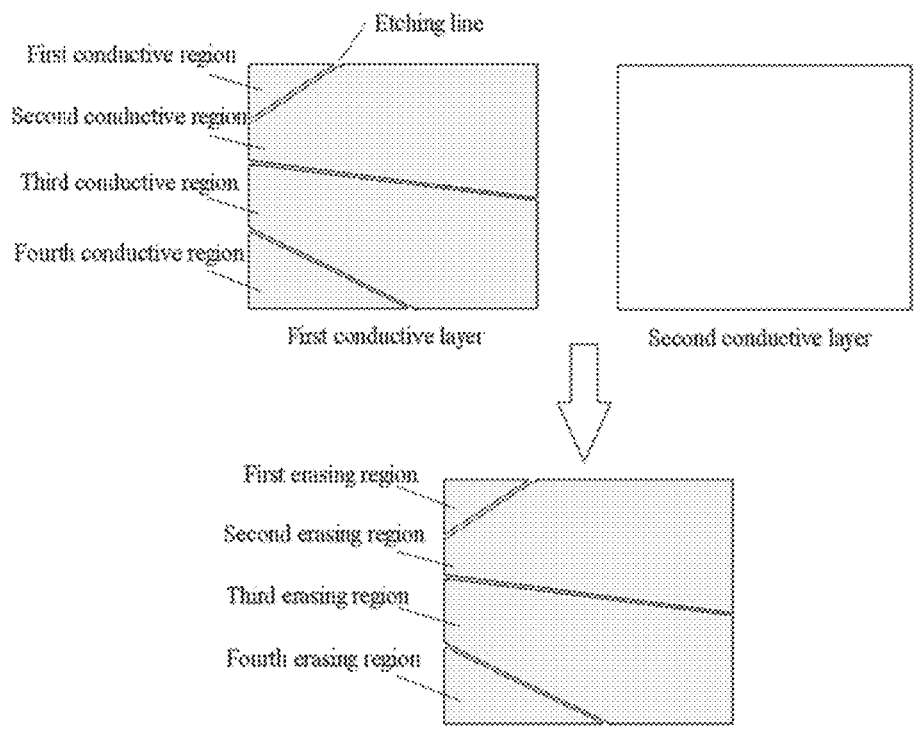
FIG. 1 is a first structural schematic diagram of a liquid crystal writing film in embodiment 1.

In which, 1. infrared transmitting tube; 2. infrared receiving tube; and 3. writing region.

DETAILED DESCRIPTION OF THE EMBODIMENTS

It should be noted that the following detailed descriptions are illustrative and are intended to provide a further description of the present disclosure. Unless otherwise indicated, all technical and scientific terms used herein have the same meanings as commonly understood by those of ordinary skill in the art to which the present application belongs.

It should be noted that the terms used herein are merely for the purpose of describing particular embodiments, rather than limiting the exemplary embodiments of the present disclosure. As used herein, unless otherwise explicitly stated in the context, a singular form is intended to include plural forms. In addition, it should also be understood that when the terms "comprise" and/or "include" are used in the specification, they indicate the presence of features, steps, operations, devices, components, and/or combinations thereof.

Embodiment 1

In order to solve the technical problem that a liquid crystal writing film cannot achieve partial erasing in the prior art, the present embodiment provides a liquid crystal writing film capable of achieving partial erasing, including: a first conductive layer, a liquid crystal layer and a second conductive layer, which are arranged in sequence from top to bottom; one of the first conductive layer and the second conductive layer is divided into two or more conductive regions that are insulated from each other; and a spatial overlapping part of the conductive regions of the liquid crystal layer and the second conductive layer form an erasing region with a liquid crystal layer region corresponding to the part together.

Or, the first conductive layer and the second conductive layer are both divided into two or more conductive regions that are insulated from each other, the conductive regions of the first conductive layer and the second conductive layer are spatially interlaced with each other, and the spatial overlapping part of the conductive regions form the erasing region with the liquid crystal layer region corresponding to the part together to achieve partial erasing.

The two adjacent conductive regions are completely disconnected to form two conductive regions that are insulated from each other, and the mutual insulation can be achieved in an etching manner, or, other implementation manners conceivable to those skilled in the art.

When the conductive layer is divided by an etching line, the shape of the etching line is not limited, and the shape of the formed conductive region is determined according to the shape and the arrangement manner of the etching line.

When the conductive layer is divided, it is ensured that each conductive region should at least include a part of an edge of the conductive layer, so that each conductive region is connected with an external circuit structure.

The width of the conductive region is 1 mm to 15 mm. This range can achieve the balance of prolonging the service life while ensuring the erasing effect, thus achieving a balance between the display effect and the service life of the writing film.

FIG. 1 shows a first implementation manner in which one of the conductive layers is divided: the first conductive layer is divided into four conductive regions as shown in the figure, the shape of each conductive region is irregular, and each conductive region includes a part of the edge of the first conductive layer; the second conductive layer is not divided; the respective overlapping parts of the first conductive region, the second conductive region, the third conductive region and the fourth conductive region on the first conductive layer with the second conductive layer form a first partial erasing region, a second partial erasing region, a third partial erasing region and a fourth partial erasing region.

Each conductive region on the first conductive layer is electrically connected with a voltage application device through an electrode and a corresponding conducting wire, so as to apply a voltage to each conductive region. The second conductive layer is electrically connected with the voltage application device through an electrode and a corresponding conducting wire, so as to apply a voltage to the second conductive layer. By applying the voltage, an electric field is formed between each conductive region of the first conductive layer and the second conductive layer, and partial erasing is achieved by using different voltage differences formed by each erasing region.

As mentioned above, the conductive layer is divided into irregular shapes, and in some other implementation manners, the first conductive layer is divided into mutually parallel strip-shaped conductive regions in consideration of the processing process of the writing film and the difficulty of leading a wire in a conductive region; and it is conducive to improving the processing efficiency, reducing the process cost, and facilitating the batch production.

Figure 2:
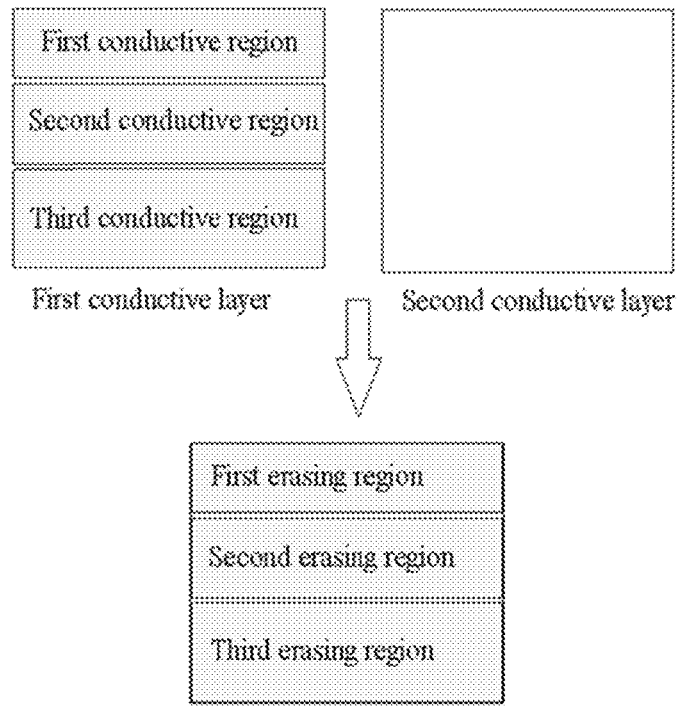
FIG. 2 is a second structural schematic diagram of the liquid crystal writing film in embodiment 1.

FIG. 2 shows a second implementation manner in which one of the conductive layers is divided: the first conductive layer is divided into three mutually parallel strip-shaped conductive regions, and the second conductive layer is not divided; the mutual overlapping parts of the conductive regions on the first conductive layer and the second conductive layer form a first erasing region, a second erasing region and a third erasing region.

Each conductive region on the first conductive layer is electrically connected with the voltage application device through an electrode and a corresponding conducting wire, so as to apply a voltage to each conductive region. The second conductive layer is electrically connected with the voltage application device through an electrode and a corresponding conducting wire, so as to apply a voltage to the second conductive layer.

Voltages are respectively applied to the conductive regions on the first conductive layer and the second conductive layer, in this way, superposition of electric fields can be respectively formed in the first erasing region, the second erasing region and the third erasing region, and partial erasing is achieved by using different electric fields formed by each erasing region.

In the above implementation manner, the conductive region is divided only on one of the conductive layers, and the area of the formed partial erasing region is determined by the conductive region, generally, the partial erasing region is relatively large, and it is suitable for large-area partial erasing equipment.

Figure 3:
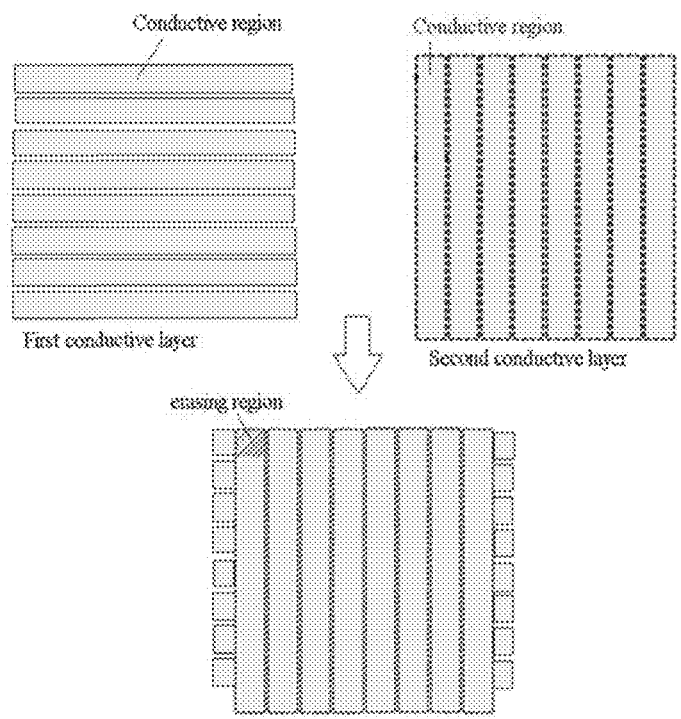
FIG. 3 is a third structural schematic diagram of the liquid crystal writing film in embodiment 1.

FIG. 3 shows an implementation manner in which the two conductive layers are both divided: the first conductive layer is divided into a plurality of horizontal conductive regions, the second conductive layer is divided into a plurality of longitudinal conductive regions, and the conductive regions are equally spaced; the conductive regions on the first conductive layer and the conductive regions on the second conductive layer are vertically interlaced with each other in the space; and the mutual overlapping parts of the conductive regions on the first conductive layer and the conductive regions on the second conductive layer form the erasing regions.

Each conductive region on the first conductive layer is electrically connected with the voltage application device through an electrode and a corresponding conducting wire, so as to apply a voltage to each conductive region. Each conductive region on the second conductive layer is electrically connected with the voltage application device through an electrode and a corresponding conducting wire, so as to apply a voltage to the second conductive layer.

Voltages are respectively applied to the conductive regions on the first conductive layer and the second conductive layer, in this way, the superposition of electric fields can be respectively formed in the erasing regions, and the partial erasing is achieved by using different pressure differences formed by each erasing region.

In FIG. 3, by dividing the conductive layer, the writing film is divided into a mesh structure, and each mesh is a separate erasing region; and this division manner is convenient for industrial batch processing, and the divided region can be smaller according to actual needs, and more accurate partial erasing can be achieved by powering different conductive strips on.

In the above implementation manner, the conductive regions of the upper and lower conductive layers are respectively divided, the area of the formed partial erasing region is determined by the spatially interlaced regions of the conductive regions in the upper and lower conductive layers, generally, the partial erasing region is relatively small, the erasing precision is high, and the writing film is particularly suitable for small-area partial erasing equipment.

Embodiment 2

In the present embodiment, the structure of the liquid crystal writing film is further optimized based on embodiment 1, including: at least one of the first conductive layer and the second conductive layer is arranged on a substrate layer. For example, the first conductive layer is arranged on a first substrate, or the second conductive layer is arranged on a second substrate, or the two conductive layers are arranged on the corresponding substrate.

Or, an insulating layer is arranged between at least one of the first conductive layer and the second conductive layer and the liquid crystal layer. For example, the insulating layer is arranged between the first conductive layer and the liquid crystal layer; or, the insulating layer is arranged between the second conductive layer and the liquid crystal layer; or, a first insulating layer is arranged between the first conductive layer and the liquid crystal layer, and a second insulating layer is arranged between the second conductive layer and the liquid crystal layer.

By adding the substrate layer, a good supporting function can be achieved on the two conductive layers, thereby facilitating the overall stability of the writing film structure. By adding the insulating layer, better mutual insulation between the two conductive layers and the liquid crystal layer can be achieved, a certain protective effect is played on the liquid crystal layer, and the service life of the writing film is prolonged.

Embodiment 3

Based on the liquid crystal writing film disclosed in embodiment 1 or embodiment 2, the present embodiment discloses a method for achieving partial erasing of the liquid crystal writing film.

In some of implementation manners, the two conductive layers are respectively divided into two or more conductive regions;

a voltage A is applied to the conductive region of the first conductive layer that covers the partial erasing region; a voltage B is applied to the conductive region of the second conductive layer that covers the partial erasing region; and the voltage A and the voltage B form an erasing electric field at the spatial overlapping location of the two conductive regions, so as to achieve the partial erasing.

A voltage C is applied to the conductive regions set at the outside of the respective conductive regions of the two conductive layers that cover the partial erasing regions, wherein the set conductive regions may be all conductive regions excluding the respective conductive regions of the two conductive layers that cover the partial erasing regions, and may also be conductive regions close to the conductive regions that cover the partial erasing regions and selected as needed.

With the voltage B as a reference value, the voltage A, the voltage B and the voltage C satisfy the following relationship:

$$|\text{voltage } A - \text{voltage } B| > |\text{voltage } A - \text{voltage } C|$$

$$|\text{voltage } A - \text{voltage } B| > |\text{voltage } C - \text{voltage } B|;$$

the voltage relationship in the present implementation manner satisfies:

$$|\text{voltage } A - \text{voltage } B| = |\text{voltage } C - \text{voltage } B| * 2.$$

It is set that the voltage A is a high erasing voltage Vh, the voltage B is a zero voltage, and the voltage C is an auxiliary voltage Va; and the high erasing voltage Vh refers to a voltage required to completely erase the handwriting.

In this way, the electric field formed on the entire liquid crystal writing film satisfies: the electric field of the to-be-erased region is the high erasing voltage Vh; the electric field of the erasing region on a cross direction with the to-be-erased region as the center is the auxiliary voltage Va, and the electric field of the remaining erasing regions is zero.

The high erasing voltage Vh and the auxiliary voltage Va need to satisfy the following relationship:

$$|Vh|>|Vh-Va|;$$

$$|VH|>|Va|;$$

we set:

$$|Vh|=|Va|*2.$$

It should be noted that the voltages applied to the two conductive layers are exchanged at set time intervals, so that the electric fields formed on the entire liquid crystal writing film have the same magnitude but opposite directions, thereby avoiding the occurrence of liquid crystal polarization resulted from that the electric field in the same direction is applied to the liquid crystal writing film for a long time. Hereinafter, we refer to two time periods in which the electric field directions are different as a first half and a second half respectively.

Figure 4:
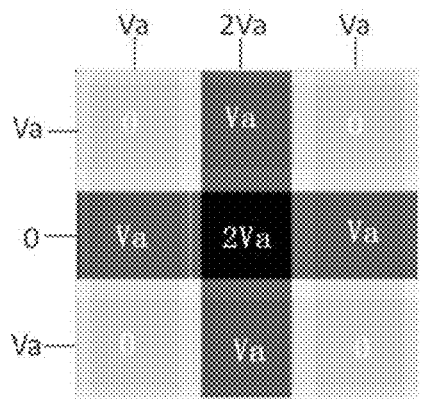
FIG. 4 is a first schematic diagram of applying a voltage to a first half of each conductive region of a liquid crystal writing film in embodiment 3 to achieve erasing.
Figure 5:
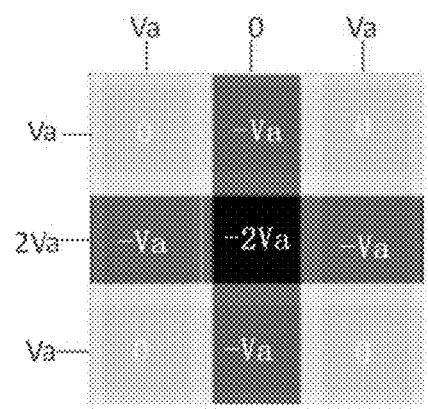
FIG. 5 is a first schematic diagram of applying a voltage to a second half of each conductive region of a liquid crystal writing film in embodiment 3 to achieve erasing.

The voltage applied to each conductive region of the liquid crystal writing film is as shown in FIG. 4 or FIG. 5. FIG. 4 shows the voltage applied in the first half of each conductive region of the liquid crystal writing film, and FIG. 5 shows the voltage applied in the second half of each conductive region of the liquid crystal writing film; and the sequences of applying the voltages to the first half and the second half can be exchanged.

As can be seen from FIG. 4, only the region in which the electric field is 2Va is completely erased at the moment, and the region in which the electric field is 0 is not erased. The region in which the electric field is Va is not completely erased, but since the electric field is also present, the molecular arrangement mode of the writing film changes to some extent under the action of the applied electric field. Because the complete erasing voltage is not reached, the molecules cannot completely change from a planar structure into a focal conic structure, but will generate certain influence on the display effect, the handwriting in this part of region becomes shallow visually, and this is not desirable for the partial erasing.

As can be seen from FIG. 5, the electric fields formed on the writing film have opposite directions, only the region in which the electric field is −2Va is completely erased, the region in which the electric field is 0 is not erased, and the region in which the electric field is −Va is not completely erased, but the problems described in FIG. 1 also exist.

Figure 6:
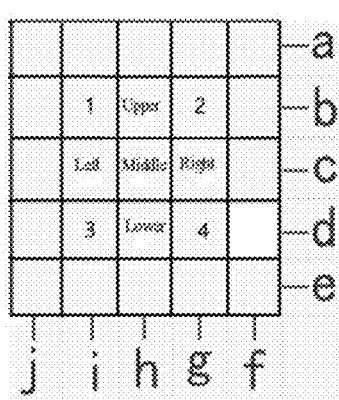
FIG. 6 is a specific erasing instance in embodiment 3.
Figure 7:
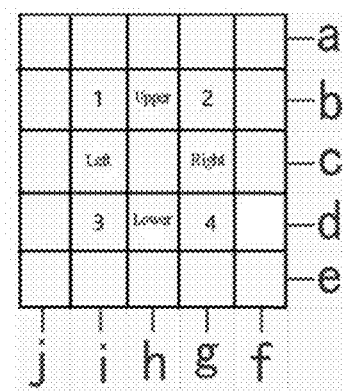
FIG. 7 is a schematic diagram of an erasing effect in FIG. 6.

FIG. 6 and FIG. 7 show specific examples to illustrate a generation and control method of the partial erasing voltage of the writing film of the present invention. In FIG. 6, if only the Chinese character "Zhong (middle)" is expected to be erased, it is needed that the high erasing voltage 2Va is applied to the conductive region corresponding to h in the first half, the zero voltage is applied to the conductive region corresponding to c, and the auxiliary voltage Va is applied to the remaining conductive regions. In this way, the electric field formed in the erasing region where the Chinese character "Zhong" is located is 2Va, the condition of complete erasing is achieved, and thus complete erasing can be realized; and the handwriting of the four Chinese characters "Shang (upper), Xia (lower), Zuo (left) and You (right)" becomes shallow to influence the visual effect, as shown in FIG. 7. The principle is the same for the second half.

A partial erasing implementation method disclosed in some other implementation manners can solve the problem that the peripheral handwriting becomes shallow in the above-mentioned implementation manner; specifically, the two conductive layers are respectively divided into two or more conductive regions; the voltage A is applied to the conductive region of the first conductive layer that covers the partial erasing region; the voltage B is applied to the conductive region of the second conductive layer that covers the partial erasing region; and the voltage A and the voltage B form the erasing electric field at the spatial overlapping location of the two conductive regions, so as to achieve the partial erasing.

A voltage D is applied to the conductive region set at the outside of the conductive region on the first conductive layer that covers the partial erasing region, and a voltage E is applied to the conductive region set at the outside of the conductive region on the second conductive layer that covers the partial erasing region; and the set conductive regions may be all conductive regions excluding the respective conductive regions of the two conductive layers that cover the partial erasing regions, and may also be conductive regions close to the conductive regions that cover the partial erasing regions and selected as needed.

With the voltage B as a reference value, the voltage A, the voltage B, the voltage D and the voltage E satisfy the following relationship:

$$|\text{voltage } A-\text{voltage } B|>|\text{voltage } D-\text{voltage } B|$$

$$|\text{voltage } A-\text{voltage } B|>|\text{voltage } A-\text{voltage } E|$$

$$|\text{voltage } A-\text{voltage } B|>|\text{voltage } D-\text{voltage } E|$$

the voltage relationship in the present implementation manner satisfies:

$$|\text{voltage } A-\text{voltage } B|=|\text{voltage } D-\text{voltage } B|*3$$

$$|\text{voltage } E-\text{voltage } B|=|\text{voltage } D-\text{voltage } B|*2.$$

It is set that the voltage A is a high erasing voltage Vh, the voltage B is a zero voltage, the voltage D is a second auxiliary voltage Va2, and the fifth voltage is a first auxiliary voltage Va1; and the high erasing voltage Vh refers to a voltage required to completely erase the handwriting.

In this way, the electric field formed on the entire liquid crystal writing film satisfies: the voltage difference of the to-be-erased region is the high erasing voltage, and the voltage differences of the remaining erasing regions are all the second auxiliary voltage Va2.

The high erasing voltage Vh and the auxiliary voltages Va1, Va2 need to satisfy the following relationship:

$$|Vh|>|Va2|$$

$$|Vh|>|Vh-Va1|$$

$$|Vh|>|Va2-Va1|;$$

we set:

$$|Vh|=|Va2|*3;$$

$$|Va1|=|Va2|*2.$$

Figure 8:
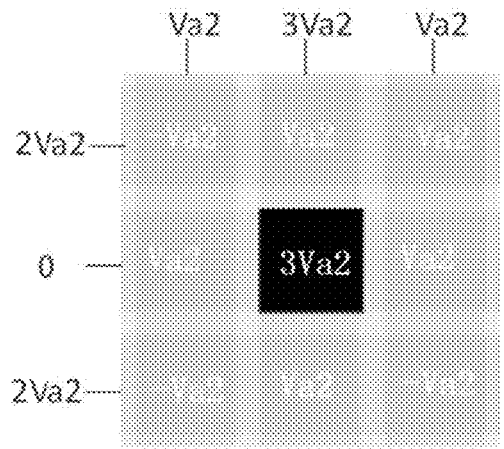
FIG. 8 is a second schematic diagram of applying a voltage to the first half of each conductive region of the liquid crystal writing film in embodiment 3 to achieve erasing.
Figure 9:
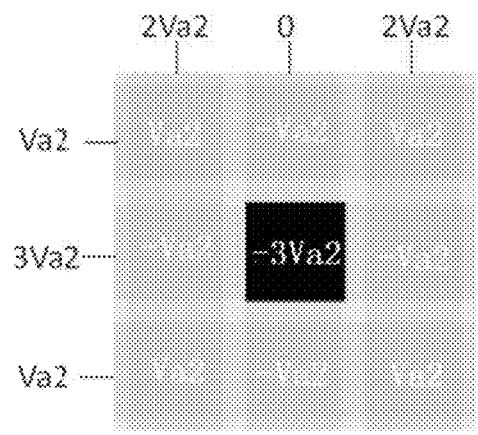
FIG. 9 is a second schematic diagram of applying a voltage to the second half of each conductive region of the liquid crystal writing film in embodiment 3 to achieve erasing.

The voltage applied to each conductive region of the writing film is as shown in FIG. 8 or FIG. 9. FIG. 8 shows the voltage applied in the first half of each conductive region of the writing film, and FIG. 9 shows the voltage applied in the second half of each conductive region of the writing film; and the sequences of applying the voltages to the first half and the second half can be exchanged. The meanings of the first half and the second half in the present embodiment are the same as those in embodiment 1.

As can be seen from FIG. 8, only the region in which the electric field is 3Va2 is completely erased at the moment, and the region in which the electric field is Va2 is not erased. Although the liquid crystal molecules in the region in which the electric field is Va2 are affected by the electric field, the change rules of the molecules are the same due to the same electric field, and this influence is consistent and generates no visual display difference, therefore, it can be deemed that the region in which the electric field is Va2 is not erased. In this way, the complete erasing of a partial to-be-erased region is achieved, and the handwriting in the regions other than the partial to-be-erased region is not affected by the erasing.

As can be seen from FIG. 9, the electric fields formed on the writing film have opposite directions, only the region in which the electric field is −3Va2 is completely erased, and the region in which the electric field is −Va2 is not erased.

Figure 10:
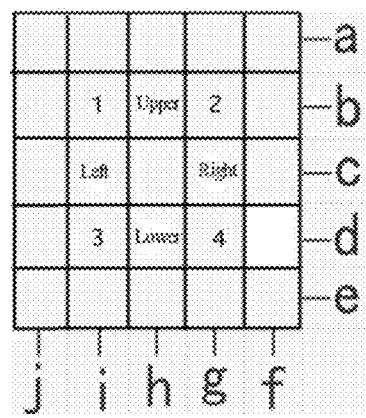
FIG. 10 is a schematic diagram of a specific erasing effect.

Still taking FIG. 6 as an example, if only the Chinese character "Zhong" is expected to be erased, then:

for the first conductive layer, it is needed that the high erasing voltage 3Va2 is applied to the conductive region corresponding to h in the first half, and the second auxiliary voltage Va2 is applied to the conductive regions corresponding to f, g, i and j; the zero voltage is applied to the conductive region corresponding to h in the second half, and the first auxiliary voltage 2Va2 is applied to the conductive regions corresponding to f, g, i and j;

for the second conductive layer, it is needed that the zero voltage is applied to the conductive region corresponding to c in the first half, and the first auxiliary voltage 2Va2 is applied to the conductive regions corresponding to a, b, d, e; the auxiliary high voltage 3Va2 is applied to the conductive region corresponding to c in the second half, and the second auxiliary voltage Va2 is applied to the conductive regions corresponding to a, b, d, e;

In this way, no matter in the first half or the second half, the electric field of the region where the Chinese character "Zhong" is located, namely, the interlaced region of the conductive regions corresponding to h and c is 3Va2, the erasing voltage is reached, and the Chinese character "Zhong" is completely erased; the electric fields of the remaining regions are the same and are all Va2, and there is almost no change in the handwriting visually, as shown in FIG. 10. The purpose that only the Chinese character "Zhong" is erased and the remaining regions are not erased is achieved.

Similarly, in FIG. 6, if only the two Chinese character words "Zhong and Xia" are expected to be erased, the voltages need to be applied in the first half are respectively as follows: the voltage of the conductive region corresponding to h is 3Va2; the voltage of the conductive regions corresponding to c and d is 0; the voltage of the conductive regions corresponding to a, b and e is 2Va2; the voltage of the conductive regions corresponding to f, g, i and j is Va2; and the voltages need to be applied in the second half are respectively as follows: the voltage of the conductive region corresponding to h is 0; the voltage of the conductive regions corresponding to c and d is 3Va2; the voltage of the conductive regions corresponding to a, b and e is Va2; and the voltage of the conductive regions corresponding to f, g, i and j is 2Va2.

In this way, no matter in the first half or the second half, the two Chinese character words "Zhong and Xia" are completely erased, and the remaining handwriting is not affected visually.

If only the three words "1, Shang and 2" are expected to be erased, the voltages need to be applied in the first half are respectively as follows: the voltage of the conductive regions corresponding to g, h and i is 3Va2; the voltage of the conductive region corresponding to b is 0; the voltage of the conductive regions corresponding to a, c, d and e is 2Va2; the voltage of the conductive regions corresponding to f and j is Va2; and the voltages need to be applied in the second half are respectively as follows: the voltage of the conductive region corresponding to h is 0, the voltage of the conductive region corresponding to b is 3Va2; the voltage of the conductive regions corresponding to a, c, d and e is Va2; the voltage of the conductive regions corresponding to f and j is 2Va2.

In this way, the three words "1, Shang and 2" are completely erased, and the remaining handwriting is not affected visually.

According to a partial erasing method of a liquid crystal writing film disclosed in some other implementation manners, the auxiliary voltage in the foregoing implementation manner does not need to be set, the voltage is only provided to the conductive region where the erasing region is located, and the remaining conductive regions at the outside of the conductive region where the erasing region is located are in a high impedance state, and cannot provide charge and discharge current. Compared with the manner of implementing the partial erasing by using the auxiliary voltage, the display of the handwriting in the surrounding region is not affected, and the cost can be reduced.

The specific process is as follows:

The two conductive layers are respectively divided into two or more conductive regions; a first voltage is applied to the conductive region of the first conductive layer that covers the partial erasing region; a zero voltage is applied to the conductive region of the second conductive layer that covers the partial erasing region; the remaining conductive regions are in the high impedance state; and the first voltage and the zero voltage form an erasing electric field at a spatial overlapping location of the two conductive regions; wherein the first voltage is at least greater than a voltage required to completely erase the handwriting, and in the present embodiment, the first voltage is the erasing voltage.

After a set time (approximately 10 MS to 200 MS), the voltages applied to the two conductive layers are exchanged, i.e., the zero voltage is applied to the conductive region of the first conductive layer that covers the partial erasing region; the first voltage is applied to the conductive region of the second conductive layer that covers the partial erasing region; and the remaining conductive regions are in the high impedance state for the set time (about 10 MS to 200 MS).

After the voltages are exchanged, the electric fields formed on the entire liquid crystal writing film have the same magnitude but opposite directions, thereby avoiding the occurrence of liquid crystal polarization resulted from that the electric field in the same direction is applied to the liquid crystal writing film for a long time. After the above process is repeated for several cycles, the partial erasing is achieved by the erasing electric field formed by the first voltage and the zero voltage at the spatial overlapping location of the two conductive regions.

Figure 11:
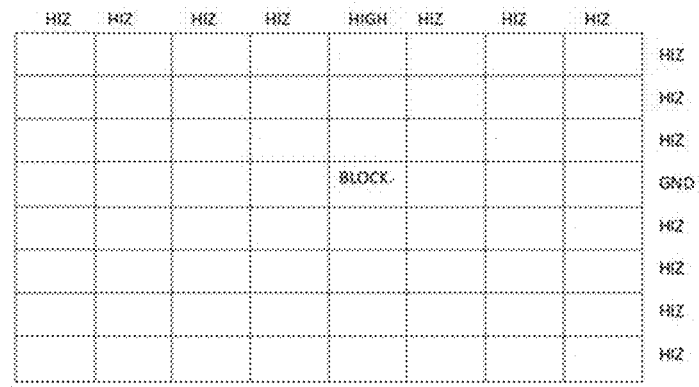
FIG. 11 is a third schematic diagram of applying a voltage to the first half of each conductive region of the liquid crystal writing film in embodiment 3 to achieve erasing.
Figure 12:
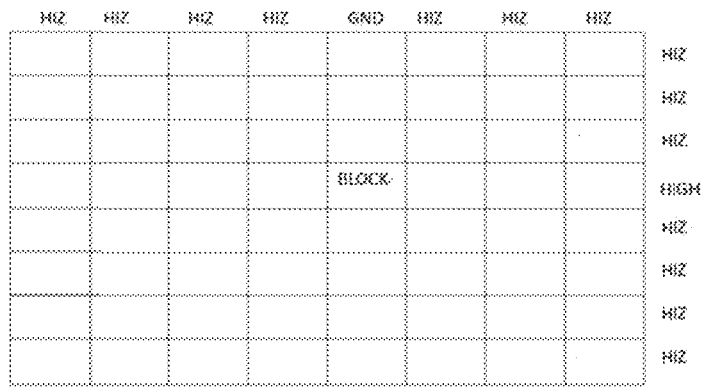
FIG. 12 is a third schematic diagram of applying a voltage to the second half of each conductive region of the liquid crystal writing film in embodiment 3 to achieve erasing.

The voltage applied to each conductive region of the liquid crystal writing film is as shown in FIG. 11 or FIG. 12. FIG. 11 shows the voltage applied in the first half of each conductive region of the liquid crystal writing film, and FIG. 12 shows the voltage applied in the second half of each conductive region of the liquid crystal writing film; and the sequences of applying the voltages to the first half and the second half can be exchanged.

A description is given below with FIG. 11 as an example.

In FIG. 11, HIZ expresses high impedance, HIGH expresses connection to the erasing voltage, and GND expresses connection to the zero voltage; and BLOCK expresses the to-be-erased region. The erasing voltage refers to a voltage required to completely erase the handwriting.

It is assumed that the first conductive layer is divided into a plurality of conductive regions that are horizontally parallel, the second conductive layer is divided into a plurality of conductive regions that are vertically parallel;

the zero voltage is applied to the conductive region on the first conductive layer where the to-be-erased region BLOCK is located, and the erasing voltage is applied to the conductive region on the second conductive layer where the to-be-erased region BLOCK is located; the remaining conductive regions are in the high impedance state; at this time, although the row or column where the to-be-erased region BLOCK is located generates an induced voltage, the column or row on the other conductive layer opposite to the row or column where the to-be-erased region BLOCK is located is in the high impedance state, so that the peripheral region of the to-be-erased region cannot provide the charge and discharge current, and no electric field is formed.

At this time, the electric field formed on the entire liquid crystal writing film satisfies: the electric field of the to-be-erased region is the erasing voltage HIGH; and no electric field is formed in the remaining erasing regions. Then, only the handwriting in the to-be-erased region BLOCK is erased, and the handwriting in the remaining regions is not affected.

Similarly, the principle of voltage application in the second half as shown in FIG. 12 is also the same.

It should be noted that the to-be-erased region BLOCK may be a partial erasing region of a minimum unit and may also be a square region combined by a plurality of partial erasing regions.

Each conductive region of the liquid crystal writing film is connected with a multi-voltage output circuit through an electrode and a corresponding conducting wire; and the multi-voltage output circuit can provide voltages in three voltage forms for each conductive region as needed: the erasing voltage, the zero voltage and the high impedance state (i.e., disconnected).

In the present implementation manner, only three types of voltage forms need to be provided, thus greatly reducing the complexity of the circuit and reducing the cost; and meanwhile, the writing delay phenomenon after the partial erasing is improved.

Figure 13:
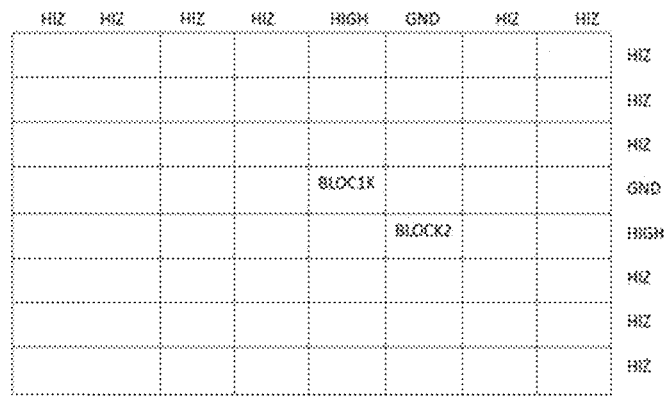
FIG. 13 is a fourth schematic diagram of applying a voltage to the first half of each conductive region of the liquid crystal writing film in embodiment 3 to achieve erasing.
Figure 14:
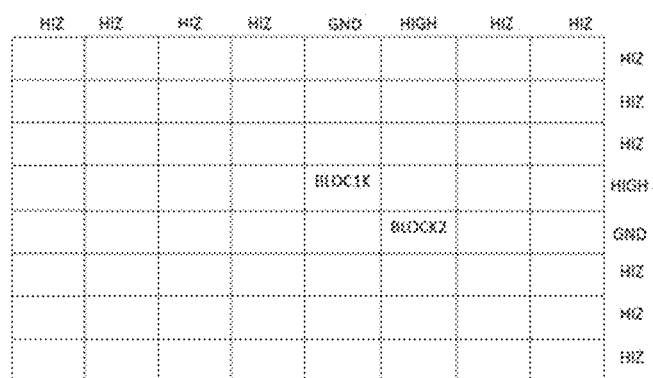
FIG. 14 is a fourth schematic diagram of applying a voltage to the second half of each conductive region of the liquid crystal writing film in embodiment 3 to achieve erasing.

By adoption of the partial erasing method of a liquid crystal writing film disclosed in some other implementation manners, two diagonal adjacent regions can be erased at the same time. The specific process is as follows: the two conductive layers are respectively divided into two or more conductive regions; it is assumed that a first partial to-be erased region BLOCK1 and a second partial to-be erased region BLOCK2 are diagonally adjacent to each other; and the voltage applied to each conductive region of the liquid crystal writing film is as shown in FIG. 13 or FIG. 14. FIG. 13 shows the voltage applied in the first half of each conductive region of the liquid crystal writing film, and FIG. 14 shows the voltage applied in the second half of each conductive region of the liquid crystal writing film; and the sequences of applying the voltages to the first half and the second half can be exchanged.

A description is given below with FIG. 13 as an example.

In FIG. 13, HIZ expresses high impedance, HIGH expresses connection to the erasing voltage, and GND expresses connection to the zero voltage; and BLOCK1 expresses the first partial to-be-erased region, and BLOCK2 expresses the second partial to-be-erased region. The erasing voltage refers to a voltage required to completely erase the handwriting.

It is assumed that the first conductive layer is divided into a plurality of conductive regions that are horizontally parallel, the second conductive layer is divided into a plurality of conductive regions that are vertically parallel;

the zero voltage is applied to the conductive region of the first conductive layer that covers the first partial to-be-erased region BLOCK1; the erasing voltage is applied to the conductive region of the second conductive layer that covers the first partial to-be-erased region BLOCK1; the erasing voltage is applied to the conductive region of the first conductive layer that covers the second partial to-be-erased region BLOCK2; the zero voltage is applied to the conductive region of the second conductive layer that covers the second partial to-be-erased region BLOCK2; the remaining conductive regions are in the high impedance state;

at this time, although the row or column where the to-be-erased region is located generates an induced voltage, the column or row on the other conductive layer opposite to the row or column where the to-be-erased region is located is in the high impedance state, so that the peripheral region of the to-be-erased region cannot provide the charge and discharge current, and no electric field is formed.

At this time, the electric field formed on the entire liquid crystal writing film satisfies: the electric field of the first partial to-be-erased region is HIGH, the electric field of the second partial to-be-erased region is –HIGH; and no electric field is formed in the remaining erasing regions. Then, only the handwriting in the first partial to-be-erased region BLOCK1 and the second partial to-be-erased region BLOCK2 is erased, and the handwriting in the remaining regions is not affected.

After a set time (approximately 10 MS to 200 MS), the voltages applied to the two conductive layers are exchanged, the voltage application mode in the second half as shown in FIG. 14 is performed, that is, the erasing voltage is applied to the conductive region of the first conductive layer that covers the first partial to-be-erased region BLOCK1; the zero voltage is applied to the conductive region of the second conductive layer that covers the first partial to-be-erased region BLOCK1; the zero voltage is applied to the conductive region of the first conductive layer that covers the second partial to-be-erased region BLOCK2; the erasing voltage is applied to the conductive region of the second conductive layer that covers the second partial to-be-erased region BLOCK2; and the remaining conductive regions are in the high impedance state; and after the above process is repeated for several cycles, the erasing of the first partial erasing region and the second partial erasing region is achieved by the erasing electric field formed by the erasing voltage and the zero voltage at the spatial overlapping location of the two conductive regions.

The voltage application method of partial erasing of the liquid crystal writing board in the present implementation manner can be achieved by providing only three types of voltage forms, thus greatly reducing the complexity of the circuit, reducing the cost, and improving the writing delay phenomenon after the partial erasing; and meanwhile, the two diagonally connected conductive regions can be erased at the same time, so that fast erasing on an oblique line direction is achieved.

Embodiment 4

Based on the method for achieving partial erasing of the liquid crystal writing film disclosed in embodiment 3, the present embodiment discloses a multi-voltage generation circuit capable of providing a required voltage form for each conductive region.

The structure of a multi-voltage output circuit includes: a main controller and a booster circuit, which are connected with each other.

The main controller is a main control unit (MCU) used for generating a control signal and outputting the control signal to the booster circuit.

The booster circuit includes one or more voltage generation units, and each voltage generation unit can generates a voltage according to the control signal of the main controller.

The main controller outputs a PWM signal to each voltage generating unit, and controls the phase difference and duty ratio of the PWM signal to control the voltage value generated by the voltage generation unit.

Each voltage generating unit includes one or more inductive booster circuits; and an input end of each inductive booster circuit receives the PWM signal output by the main controller, and an output end outputs a required voltage.

The voltage generation unit can be boosted by one inductive booster circuit, and the voltage amplitude outputted by the output end Vout is controlled by controlling the phase difference and the duty ratio of the PWM11; and when one inductive booster circuit is used, the voltage amplitude of the output end Vout fluctuates greatly, which is not conducive to a stable voltage.

The voltage generation unit can also be boosted by two or more inductive booster circuits, and the output voltage of each inductive booster circuit is superimposed into a voltage value for output, which is conducive to a stable voltage, and avoids voltage fluctuation at the output end.

Figure 15:
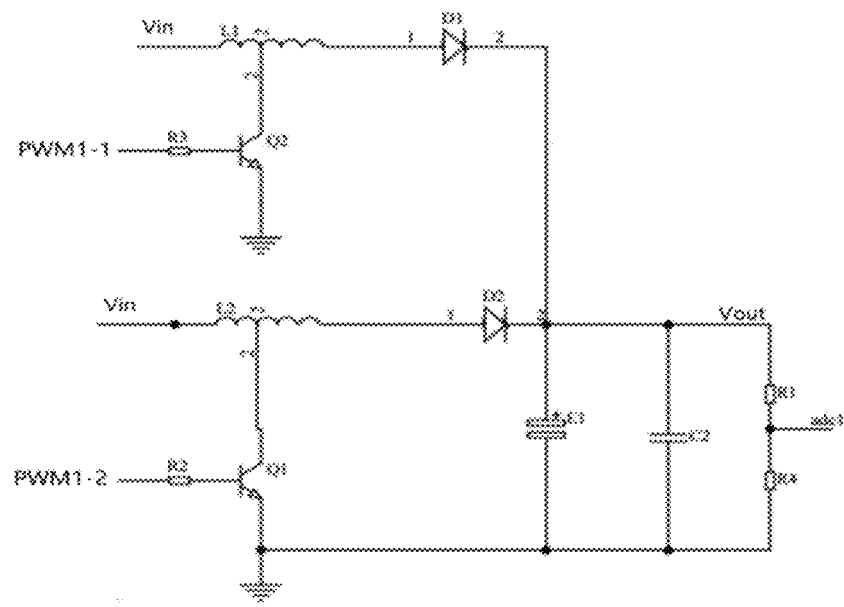
FIG. 15(a) is a structural schematic diagram of double inductive booster circuits in embodiment 4.
FIG. 15(b) is a schematic diagram of a dual inductive boosting principle in embodiment 4.
Figure 15:
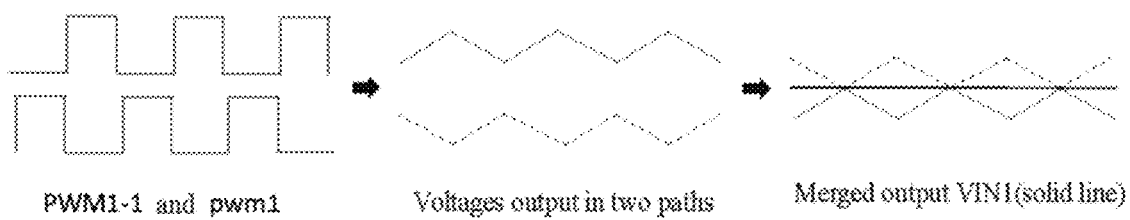

The specific structure of the voltage generation unit in the form of two inductive booster circuits is as shown in FIG. 15(a), including: a base of a triode Q1 is connected with a resistor R2 in series, a collector of the triode Q1 is connected with a center tap of an inductor L2, and an emitter of the triode Q1 is grounded; one end of the inductor L2 is connected with a power supply, the other end is connected with a positive electrode of a diode D2, and a negative electrode of the diode D2 is sequentially connected with a resistor R1 and a resistor R4 in series and then is grounded; a polar capacitor E1 and a capacitor C2 are respectively connected to both ends of a serial branch of the resistor R1 and the resistor R4 in parallel, the positive electrode of the polar capacitor E1 is connected with the negative electrode of the diode D2, and the other end is grounded; and one end of the capacitor C2 is connected with the negative electrode of the diode D2, and the other end is grounded; and the negative electrode of the diode D2 is connected with the negative electrode of a diode D1, the positive electrode of the diode D1 is connected with one end of an inductor L1, and the other end of the inductor L1 is connected with the power supply, the base of a triode Q2 is connected with a resistor R3, the collector of the triode Q2 is connected with the center tap of the inductor L1, and the emitter of the triode Q2 is grounded.

In FIG. 15(a), the voltage generation unit is composed of two inductive booster circuits, wherein, the inductor L1, the diode D1, the resistor R3 and the triode Q2 form one circuit, and the inductor L2, the diode D2, the resistor R2 and the triode Q1 form the other circuit; and input signals of the two inductive booster circuits are respectively PWM1-1 and PWM1-2 from the main controller, and after output signals of the two inductive booster circuits are superimposed, a corresponding voltage is output at the output end Vout. By adjusting the duty ratio and the phase difference of each PWM signal, the amplitude and the phase of the output voltage of each inductive booster circuit are controlled, thereby ensuring that the voltages output by the two inductive booster circuits are superimposed to obtain the required stable voltage.

If only one of the inductive booster circuits is used, the voltage value of the output Vout fluctuates greatly, which is not conducive to a stable voltage; and after the other inductive booster circuit is added, by adjusting the distribution conditions of the phase difference and the duty ratio of the PWM1-1 and PWM1-2 of the two inductive booster circuits, the finally output voltage is stabilized at a set value, an equivalent diagram of a control waveform principle is as shown in FIG. 15(b), two voltages are respectively formed by PWM1-1 and PWM1-2, and the two output voltages both fluctuate, but after the amplitudes of the two voltages are superimposed, a stable voltage value can be formed, such as a last superposed solid line part.

After superposition, the required voltage is obtained and is output to the Vout, E1 and C2 represent filter capacitors, and resistors R1 and R4 form a voltage division resistance network for detecting the output voltage value. After the output voltage is divided by the resistors R1 and R4, an output end adc1 feeds back the divided voltage to the main controller, the main controller adjusts the duty ratios and phase differences of PWM1-1 and PWM1-2 in real time according to the received feedback voltage, so as to achieve the purpose of stably outputting the required voltage value.

Figure 16:
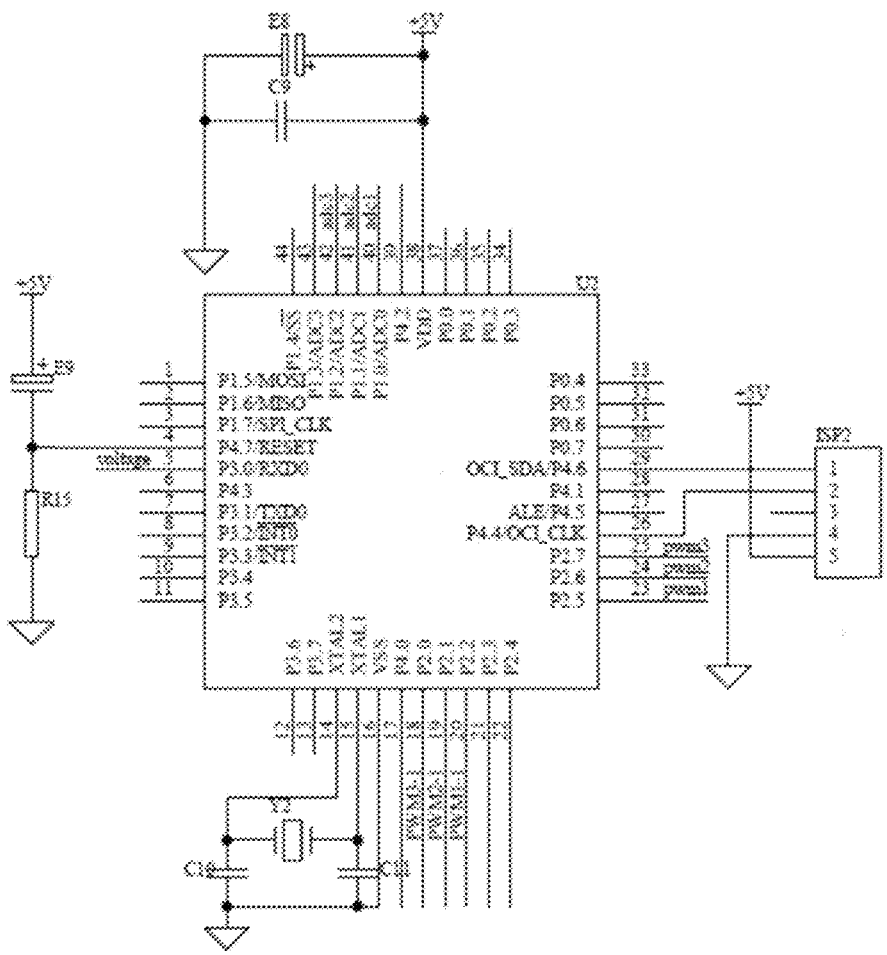
FIG. 16 is a schematic diagram of a main controller in embodiment 4.

A description is given below by taking it as an example that the booster circuit includes three voltage generation units, and each voltage generation unit is boosted by two inductive booster circuits, the three voltage generation units have the same structure and working principle; in the present embodiment, the model number of a main control chip is SM59R16A5C. As shown in FIG. 16, other main control chips known to those skilled in the art capable of realizing the functions of the present invention are also within the protection scope of the present invention.

The 18th, 19th, 20th, 23rd, 24th and 25th pins of the main control chip are respectively connected with the three voltage generation units for generating 6 PWM signals and controlling generation of three voltages with arbitrarily changeable magnitudes, and the magnitudes of the voltages are determined by the frequencies and duty ratios of the PWM signals; the 40th, 41st, and 42nd pins of the main control chip are respectively connected with the voltage division resistance network for detecting the output voltage values generated by the three voltage generation units for detecting the output voltage values of the three voltage generation units in real time and feeding back the same to the main control chip to adjust the PWM signal output in real time, so as to stably output three specific voltage values; and of course, the main control chip can also control the booster circuit to be disconnected or in a high impedance state.

Embodiment 5

Based on the liquid crystal writing film disclosed in embodiment 1 and embodiment 2 and the partial erasing method disclosed in embodiment 3, in order to achieve the partial erasing, one problem that needs to be solved is to position a to-be-erased region. The present embodiment discloses a partial erasing electromagnetic positioning system capable of effectively positioning a writing member or/and an erasing member without adding an external component that needs to occupy the writing space while erasing a partial designated region.

The partial erasing electromagnetic positioning system disclosed in an implementation manner includes a liquid crystal writing film and a main controller, wherein the first conductive layer of the liquid crystal writing film is divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other;

a spatial overlapping part of the conductive regions of the first conductive layer and the overall conductive region of the second conductive layer form an erasable region with a liquid crystal layer region corresponding to the part; and each two adjacent conductive regions in the first group are connected to form closed loops capable of receiving external electromagnetic signals, the closed loops are connected with the main controller, and the main controller converts the received electromagnetic signals into positioning signals.

By cutting the conductive layer, at least two different types of conductive regions are formed. For the sake of simplicity of principle illustration, the conductive regions are called a narrow conductive region and a wide conductive region (it is worth noting that the narrow and wide conductive regions can have various sizes or shapes, as long as the set requirements are met), the narrow conductive region and the wide conductive region are arranged at intervals, so that the narrow conductive region forms a closed loop, after being powered on, when an object having magnetism or an electromagnetic wave signal approaches, the closed loop can generate induced current, and the approximate location of the object on the writing film can be determined through the generation location and intensity of the induced current so as to achieve the positioning.

Of course, only the second conductive layer may also be divided. Since other technical details may be the same except for the divided conductive layer, the embodiment in which only the second conductive layer is divided will not be described repeatedly herein.

It is better if the set value A is smaller on the premise of not affecting the conductivity of the first group of conductive regions, this is because some conductive regions need to be powered on when the first group of conductive regions is positioned, which may affect the structure of the liquid crystal layer at the corresponding location and may affect the handwriting effect, and if the set value A is smaller, better completeness and effect of the handwriting can be guaranteed. Of course, the value A cannot be infinitely small, as on one hand, it is not advantageous for the processing, and on the other hand, the conductivity of the conductive region after the processing cannot be guaranteed.

The width range of the first group of conductive regions needs to adapt to the specific application condition so as to ensure the handwriting display effect while ensuring the positioning effect, and realize the display effect of the writing film and the balance between the positioning accuracy and the precision.

The width range of the second group of conductive regions needs to adapt to the specific application condition so as to ensure a reasonable maximum use time limit while ensuring the erasing effect, and realize the balance between the display effect and the service life of the writing film.

Figure 17:
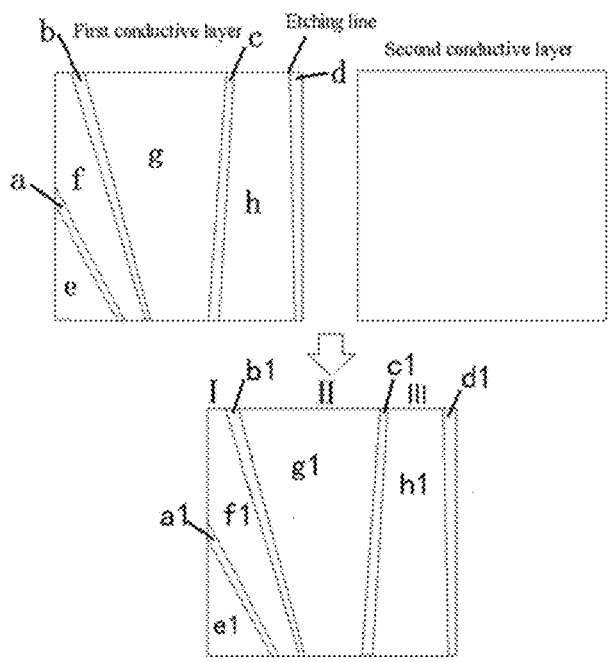
FIG. 17 is a structural schematic diagram of a first implementation manner of a partial erasing electromagnetic positioning system in embodiment 5.

In FIG. 17, the first group of conductive regions includes four conductive regions a, b, c, and d, and the second group of conductive regions includes four conductive regions e, f, g, and h, and the conductive regions in the same group are not adjacent to each other.

The shape of each conductive region is irregular, and each conductive region includes a part of the edge of the first conductive layer; the second conductive layer is not divided; and the mutual overlapping parts of the a, b, c, d, e, f, g, h conductive regions on the first conductive layer with the second conductive layer form erasable regions a1, b1, c1, d1, e1, f1, g1, h1.

A and b are connected by a conducting wire to form a closed loop, similarly, b and c, c and d form separate closed loops, and the closed loops are loops I, II and III respectively. The main controller controls sequential conduction and performs polling, for example, the loop I is turned on firstly, then the loop II is turned on, then the loop III is turned on, and the loop I is recovered to be turned on again to continue the circulation.

When the division number of the conductive regions is large, different loops can be turned on at intervals, different closed loops are turned on at intervals, and the polling is performed; when a certain closed loop receives an electromagnetic signal and generates induced current, the main controller converts the induced current into a positioning signal so as to achieve primary positioning; and the closed loops for positioning within an initial positioning region setting range are continuously turned on in sequence to perform precise positioning. Firstly, the detection is performed by rough positioning to reduce electric energy input and to improve the detection efficiency, and then the positioning accuracy is improved by precise positioning.

A partial erasing electromagnetic positioning system disclosed in another implementation manner includes a liquid crystal writing film and a main controller, wherein the first conductive layer and the second conductive layer are both divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other;

spatial overlapping parts of the conductive regions of the first conductive layer and the second conductive layer form erasable regions with a liquid crystal layer region corresponding to the part; and each two adjacent conductive regions in the first group are connected to form closed loops capable of receiving external electromagnetic signals, the closed loops are connected with the main controller, and the main controller converts the received electromagnetic signals into positioning signals.

Figure 18:
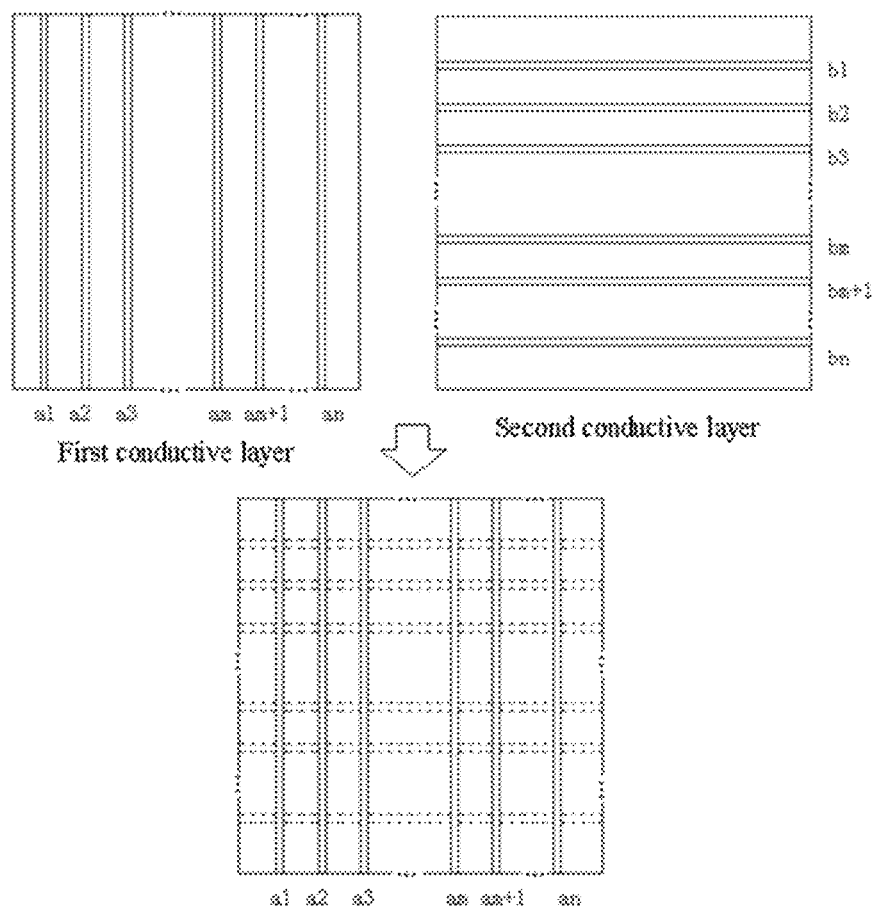
FIG. 18 is a structural schematic diagram of a second implementation manner of the partial erasing electromagnetic positioning system in embodiment 5.

The divisional form of the conductive region on the first conductive layer or the second conductive layer is as shown in FIG. 18. Of course, in this figure, in order to better explain that a conductive region with relatively high density can be arranged on the conductive layer, undrawn places, such as $a_4$ to $a_{m-1}$, $a_{m+2}$ to $a_{n-1}$, $b_4$ to $b_{m-1}$ are consistent with the drawn places, and can also be different from the structure and/or size of the region that has been shown. At the same time, those skilled in the art should understand that, these drawings are only schematic diagrams, and the proportional relationships of the etching lines, the first group of conductive regions and the second group of conductive regions are not necessarily as shown in the figures.

Compared with the foregoing implementation manner, the upper and lower conductive layers are respectively divided to ensure that when an object having magnetism or an electromagnetic wave signal approaches, the first group of conductive regions at corresponding locations of the upper and lower conductive layers can generate the induced current, and the location of the object on the writing film can be determined through the generation location and intensity of the induced current so as to achieve positioning. The positioning of the system belongs to two-dimensional positioning, so that the coordinates of the object relative to two directions (x axis, y axis) of the horizontal plane of the writing film can be known, the positioning region is miniaturized, and the positioning effect is better.

As a detailed description, for example, when the loop formed by the conductive regions $a_m$ and $a_{m+1}$ on the first conductive layer and the loop formed by the conductive regions $b_n$ and $b_{n-1}$ on the second conductive layer simultaneously detect an induced current signal, it indicates that an erasing member or a writing member with magnetism or an electromagnetic signal is in the vicinity of the erasable region G, so that the locations of the erasing member or the writing member on the two directions (x axis, y axis) of the horizontal plane of the writing film can be identified, and compared with the situation that only an approximate region can be positioned in embodiment 1, a certain improvement is achieved.

On the first conductive layer, the first group of conductive regions have the same width, and the second group of conductive regions have the same width; and on the second conductive layer, the first group of conductive regions have the same width, and the second group of conductive regions have the same width.

The set width range of the first group of conductive regions needs to adapt to the specific application condition so as to ensure the handwriting display effect while ensuring the positioning effect, and realize the display effect of the writing film and the balance between the positioning accuracy and the precision.

The set width range of the second group of conductive regions needs to adapt to the specific application condition so as to ensure a reasonable maximum use time limit while ensuring the erasing effect, and realize the balance between the display effect and the service life of the writing film.

The width of the first group of conductive regions on the first conductive layer is the same as the width of the first group of conductive regions on the second conductive layer; and the width of the second group of conductive regions on the first conductive layer is the same as the width of the second group of conductive regions on the second conductive layer.

This manner is convenient for industrial batch processing, and meanwhile, the divided region can be miniaturized according to actual needs, and more accurate partial erasing and positioning can be realized by powering different conductive strips on. Of course, the manner of uniform etching described above can be changed in the case of particular application objects or design requirements.

The entire writing film can be meshed and coordinated, which is similar to a chessboard, each mesh is a separate erasing region, meanwhile it is ensured that when the object having magnetism or the electromagnetic wave signal approaches, the first group of conductive regions at corresponding locations of the upper and lower conductive layers can generate the induced current, and the x axis and y axis coordinates of the object on the writing film can be determined through the generation location and intensity of the induced current, the positioning region is miniaturized, and the positioning effect is better.

At the same time, this setting manner is also convenient for processing, and meanwhile, the size of each erasable region is ensured to be uniform, which is more conducive to the positioning and partial erasing and also provides better writing experience for users.

Figure 19:
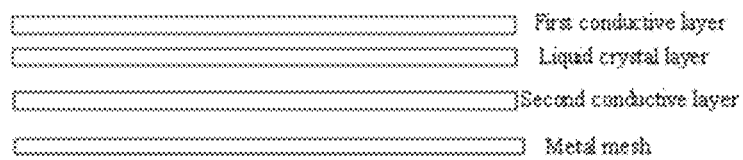
FIG. 19(a) is a structural side view of a third implementation manner of the partial erasing electromagnetic positioning system.
FIG. 19(b) is a structural exploded view of the third implementation manner of the partial erasing electromagnetic positioning system.
Figure 19:
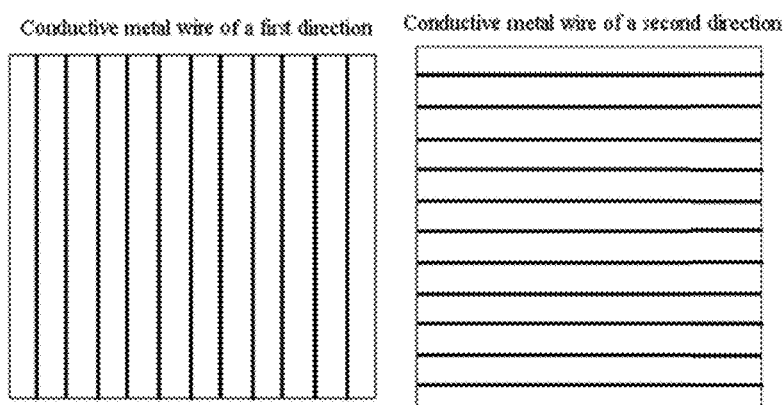

A partial erasing electromagnetic positioning system disclosed in another implementation manner, as shown in FIGS. 19(a) and 19(b), includes a liquid crystal writing film, a main controller and a conductive metal mesh, wherein:

at least one of the first conductive layer and the second conductive layer is divided into two or more conductive regions that are insulated from each other;

a common overlapping part of the conductive regions of the first conductive layer and the second conductive layer and the liquid crystal layer is an erasable region;

the conductive metal mesh is arranged on the back face of the liquid crystal writing film, the conductive metal mesh includes a plurality of conductive metal wires, each two adjacent conductive metal wires are connected to form a closed loop, and the main controller is connected with the conductive metal wires to provide electrical signals for the conductive metal wires.

In the present implementation manner, the conductive metal wire is a copper wire.

The difference with the foregoing implementation manner lies in that, the closed loop is formed by connection of every two conductive metal wires of the conductive metal mesh; after the closed loop is powered on, when the object with magnetism or the electromagnetic wave signal approaches, the induced current can be generated, and the approximate location of the object on the writing film can be determined through the generation location and intensity of the induced current so as to achieve the positioning.

Since the conductive metal mesh is arranged on the back face of the liquid crystal writing film, it does not affect the writing or display.

Of course, only the approximate location on a one-dimensional direction can be located in this manner, as shown in FIG. 19(a), it can be only positioned that the object with magnetism or the electromagnetic wave signal is between $a_1$ and $a_2$ or between $a_m$ and $a_{m+1}$, however, the position on the longitudinal direction between $a_m$ and $a_{m+1}$ cannot be determined.

Of course, it can also be configured as the structural form as shown in FIG. 4(b), the conductive metal mesh includes a first metal layer and a second metal layer, each of the first metal layer and the second metal layer includes a plurality of conductive metal wires, each two adjacently arranged conductive metal wires on each metal layer are connected to form a closed loop, and the main controller is connected with the conductive metal wires to provide electrical signals for the conductive metal wires.

The conductive metal mesh is of a two-layer structure, so that different conductive metal wires of the upper and lower metal layers can participate in the positioning, the coordinates of the object with magnetism or the electromagnetic wave signal on two directions (x axis, y axis) of the horizontal plane of the writing film can be confirmed, the positioning region is miniaturized, and the positioning effect is better. That is, it can be determined that the object is between $a_m$ and $a_{m+1}$, it can also be determined that the object is between $b_m$ and $b_{m+1}$.

The conductive metal wires of each metal layer are parallel to each other, and the conductive metal wires located on different metal layers are vertical to each other.

This division manner is convenient for the industrial batch processing, and meanwhile, a positioned divided region can be miniaturized, banded and standardized according to the actual needs.

The main controller sequentially sends the electrical signals to the connected conductive metal wires.

The main controller sends the electrical signals, and turns on different metal wires for positioning at intervals, and performs polling; when a certain metal wire generates induced current, initial positioning is achieved, and the metal wires located within a set range of a primary positioning region for positioning are controlled to be turned on in sequence to perform accurate positioning.

For example, during the continuous conduction, the first metal layer performs polling from the loops $a_1 \ldots a_m \ldots a_n$ in sequence, and the second metal layer performs polling from the loops $b_1 \ldots b_m \ldots b_n$ in sequence to perform the positioning. Of course, if an induction signal is measured in the vicinity of $a_m$ and $b_m$, then the polling is performed only within the range of x in the periphery of $a_m$ and $b_m$, the other locations are not detected anymore, so that the detection efficiency can be improved.

Of course, in order to better improve the efficiency, the interval conduction manner may be adopted. For example, the first metal layer performs polling from the loops $a_1$, $a_4$, $a_8 \ldots a_m \ldots a_{m+8} \ldots$, the second metal layer performs polling from the loops $b_1$, $a_5$, $a_{10} \ldots a_m \ldots a_{m+5} \ldots$ at intervals. When the induction signal is measured in the vicinity of $a_m$ and $b_m$, then the polling is performed only within the range of x in the periphery of $a_m$ and $b_m$, the other locations are not detected anymore, so that the detection efficiency can be improved.

Of course, during the precise polling, sequential polling can be performed within the precise polling ranges of the first metal layer and the second metal layer, or, the location of a certain metal layer is fixed, that is, taking the case that the loop $a_m$ is fixed as an example, the polling is performed on $b_{m-10} \ldots b_{m+10}$ in sequence.

Of course, the metal mesh can be directly used and specifically includes conductive metal wires arranged along a first direction and conductive metal wires arranged along a second direction, the first direction intersects with the second direction to form a mesh, the conductive metal wires arranged along different directions are insulated from each other, each two adjacently arranged conductive metal wires along the same direction are connected to form a closed loop, and the main controller is connected with the conductive metal wires to provide electrical signals for the conductive metal wires.

The above weaving technique is the prior art and can be realized, and the specific weaving process is not repeatedly described in detail in the present embodiment.

The conductive metal mesh may also be replaced by a conductive fiber mesh, the conductive fiber mesh includes a plurality of conductive fibers, each two adjacently arranged conductive fibers can be configured as closed loops for receiving external electromagnetic signals, the closed loops are connected with the main controller, and the main controller converts the received electromagnetic signals into positioning signals.

The conductive fibers include a group of conductive fibers along the first direction and a group of conductive fibers along the second direction, and the two groups of conductive fibers are insulated from each other and form the conductive fiber mesh in the space.

A partial erasing electromagnetic positioning system disclosed in another implementation manner includes a liquid crystal writing film, a main controller and a conductive film, wherein:

the conductive film is arranged on the front face or back face of the liquid crystal writing film;

the conductive film includes a first conductive layer and a second conductive layer;

the first conductive layer or the second conductive layer is divided into at least two groups of conductive regions that are insulated from each other, the maximum width of the first group of conductive regions is less than a set value A, the minimum width of the second group of conductive regions is greater than a set value B, A is less than B, the two groups of conductive regions are distributed at intervals, and the conductive regions in the same group are not adjacent to each other; and the first group of conductive regions is used as signal receiving regions, each two adjacent conductive regions in the first group are configured as closed loops for receiving external electromagnetic signals, the closed loops are connected with the main controller, and the main controller converts the received electromagnetic signals into positioning signals.

Of course, instead of adopting a layering form, the conductive film can be cut into wide and narrow conductive strips, so that the conductive film is divided into at least two groups of conductive regions that are insulated from each other, the maximum width of the first group of conductive regions is less than the set value A, the minimum width of the second group of conductive regions is greater than the set value B, A is less than B, the two groups of conductive regions are distributed at intervals, and the conductive regions in the same group are not adjacent to each other; and the first group of conductive regions is used as signal receiving regions, each two adjacent conductive regions in the first group are configured as closed loops for receiving external electromagnetic signals, the closed loops are connected with the main controller, and the main controller converts the received electromagnetic signals into positioning signals.

Embodiment 6

Figure 20:
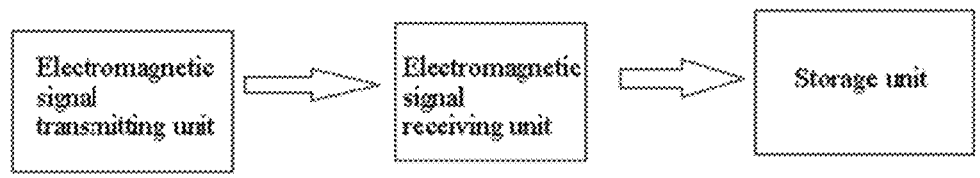
FIG. 20 is a first block diagram of a writing trajectory positioning and recording device based on a liquid crystal writing film in embodiment 6.

Based on the partial erasing electromagnetic positioning system disclosed in embodiment 5, a writing trajectory positioning and recording device is disclosed;

the writing trajectory positioning and recording device disclosed in some implementation manners, as shown in FIG. 20, includes a writing end, the partial erasing electromagnetic positioning system disclosed in embodiment 5, a storage unit and/or a transmission unit;

an electromagnetic signal transmitting unit is arranged on the writing end;

the closed loop in the partial erasing electromagnetic positioning system receives the electromagnetic signal emitted by the writing end and form a positioning signal of a writing trajectory; and a controller in the partial erasing electromagnetic positioning system is connected with the storage unit and/or the transmission unit, and the storage unit records the positioning signal of the writing trajectory and/or the transmission unit transmits the positioning signal of the writing trajectory.

In a specific implementation example, the storage unit may be included in the writing trajectory positioning and recording device based on the liquid crystal writing film, and may also be not arranged in the writing trajectory positioning and recording device based on the liquid crystal writing film, and transmits the positioning signal of the writing trajectory to a server or other external devices only through the transmission unit.

The external device performs further data processing after receiving the positioning signal of the writing trajectory, stores the positioning signal in the form of a picture, a PDF format or a text format and displays the positioning signal in a display.

Another manner is that in practical application, a liquid crystal board where the liquid crystal writing end or the liquid crystal writing film is located includes a storage unit to realize the local storage of the positioning signal of the writing trajectory, wherein the storage unit is a storage chip, common storage chips that can meet the storage capacity requirement can be adopted. Specifically, after the positioning signal of the writing trajectory is stored, in order to transmit the positioning signal of the writing trajectory, in the present application, the storage unit is also connected with a control circuit, the control circuit is connected to a signal transmission interface, the signal transmission may be performed in a wired or wireless manner, a transmission device corresponding to the foregoing transmission mode is used on the transmission interface, the specific transmission interface is not described herein and can be implemented by using related art in the prior art. The data is transmitted to a user terminal through the signal transmission interface. The user terminal is a mobile phone or an ipad or a computer terminal or the like, and the content written by the writing end on the liquid crystal panel is viewed by the terminal device, the storage of the positioning signal of the writing trajectory of the present application can form a historical record of the writing, the historical record can be called and viewed at any time, so that the writing trajectory positioning and recording device is more intelligent.

The partial erasing electromagnetic positioning system can be further provided with a wireless signal transmitting module, the wireless signal transmitting module sends the writing information to a remote wireless signal receiving module to store the handwriting, the stored content can be stored in the cloud through a network and the like, the cloud realizes the remote storage of the handwriting, and the user terminal queries the writing information by accessing the cloud data.

When the use group of the liquid crystal writing board is large, that is, when different users use writing ends to write on the corresponding liquid crystal writing film, here, better monitoring and management of the contents written by the large number of liquid crystal writing ends cannot be achieved only in the local storage mode. Therefore, a remote storage means is needed, the remote storage means is to transmit the information written by the liquid crystal writing ends to the cloud through the network and the like, relevant information of different liquid crystal writing ends is stored in the cloud, relevant persons can view the relevant information written by different users through the cloud. On one hand, the use conditions of different users can be checked, and on the other hand, the insufficient storage capacity, easy loss of the storage and other problems caused by the local storage can also be avoided from the angle of the users.

Specifically, the writing end is a writing tip or any other structures capable of satisfying the writing requirements, the writing end is provided with a signal transmitting unit, and the signal transmitting unit is a signal transmitting source capable of transmitting electromagnetic signals. The closed loop can receive the electromagnetic signals transmitted by the transmitting source, and determine the locations of the writing end and the liquid crystal writing film by using the intensity of the electromagnetic signals transmitted by the transmitting source, thereby realizing the positioning, recording and storage of the writing trajectory.

Figure 21:
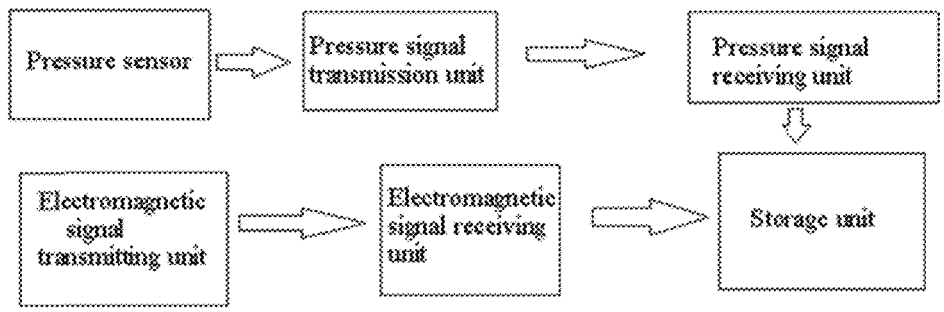
FIG. 21 is a second block diagram of the writing trajectory positioning and recording device based on the liquid crystal writing film in embodiment 6.

The writing trajectory positioning and recording device disclosed in some implementation manners, as shown in FIG. 21, includes a writing end, the partial erasing electromagnetic positioning system disclosed in h embodiment 5, a storage unit and/or a transmission unit;

an electromagnetic signal transmitting unit, a pressure sensor and a pressure signal transmission unit are arranged on the writing end, the closed loop receives the electromagnetic signal emitted by the electromagnetic signal transmitting unit and forms a positioning signal of a writing trajectory;

the pressure sensor detects a writing pressure signal and transmits the pressure signal to a pressure signal receiving unit; and the data received by the pressure signal receiving unit and the positioning signal of the writing trajectory are recorded and stored by the storage unit and/or the transmission unit.

In a specific implementation example, the storage unit may be included in the writing trajectory positioning and recording device based on the liquid crystal writing film, and may also be not arranged in the writing trajectory positioning and recording device based on the liquid crystal writing film, and just transmits the positioning signal of the writing trajectory to a server or other external devices through the transmission unit.

The external device performs further data processing after receiving the positioning signal of the writing trajectory, stores the positioning signal in the form of a picture, a PDF format or a text format and displays the positioning signal in a display.

During actual writing, in a writing process of the writing end, if the used pressure is greater, the writing end will generate a greater pressure, the handwriting formed by the greater pressure on the liquid crystal film forms thicker handwriting by using a signal processing means, real-time detection of the writing state of the handwriting can be realized in the above manner, and the handwriting is restored to handwriting that can be expressed as handwriting having thickness expression corresponding to the writing pressure, and the above-mentioned technical means can better realize the display of the writing state.

Embodiment 7

Based on the partial erasing liquid crystal writing film disclosed in embodiment 1 and embodiment 2, the present embodiment discloses a partial erasing ultrasonic positioning system of a liquid crystal writing film, which is capable of accurately positioning a partial erasing location. The specific structure is as follows: at least one ultrasonic transmitting device is arranged on an erasing object, so that it becomes a special eraser capable of emitting ultrasonic waves of specific frequency, which is hereinafter referred to as a special eraser.

Figure 22:
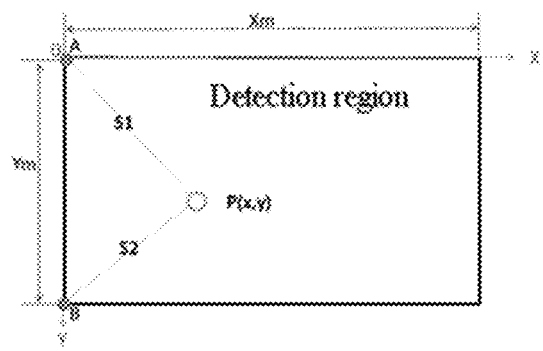
FIG. 22 is a schematic diagram of a partial erasing ultrasonic positioning system of a liquid crystal writing film in embodiment 7.

As shown in FIG. 22, an ultrasonic receiver capable of receiving ultrasonic waves having the same frequency as the special eraser is installed at two end points A and B of the same edge that have the maximum writing region sizes of Xm and Ym, the time of the special eraser is wirelessly synchronized with that of the receiver, it is set that the special eraser emits the ultrasonic waves from a point P at a moment T, the receivers A and B respectively receive ultrasonic wave signals at moments T+ΔT1, T+ΔT2, then the distances from the points A and B to the point P are respectively S1 and S2, and an equation can be obtained:

$$\begin{cases} S1 = \Delta T1 * Vs \\ S2 = \Delta T2 * Vs \end{cases};$$

wherein Vs=340 m/s represents a sound velocity parameter, if the coordinates of the point P are (x, y), then:

$$\begin{cases} x^2 + y^2 = S1^2 = (\Delta T1 * Vs)^2 \\ x^2 + (Ym - y)^2 = S2^2 = (\Delta T2 * Vs)^2 \end{cases}$$

it can be obtained that:

$$y = \frac{(\Delta T1 * Vs)^2 + Ym^2 - (\Delta T2 * Vs)^2}{2Ym}, x = \sqrt{(\Delta T1 * Vs)^2 - y^2}.$$

A tact switch for controlling the emission of the ultrasonic signals is arranged on the special eraser, the emission of the ultrasonic signal is controlled by the tact switch, the partial erasing positioning can be performed as needed, and erroneous erasing can be effectively avoided.

It should be noted that the installation locations of the ultrasonic receivers are not limited, the ultrasonic receivers may be arranged at two end points of the edge of the liquid crystal writing film and may also be arranged at any two points on the edge of the writing region of the liquid crystal writing film, the distance between the two points may be known according to the geometrical relationship, and the location information of any point in the writing region can be obtained by the above principle.

In the present embodiment, the ultrasonic receiver is arranged at the edge location of the writing film, so that the area of the frame of the writing film can be effectively reduced, and the requirements of the user for a frameless liquid crystal writing device can be met.

Alternatively, the ultrasonic receivers can also be arranged on the periphery of the liquid crystal writing film, such as the frame of the liquid crystal writing board or a liquid crystal blackboard; of course, if the ultrasonic receivers are arranged at the two end points on one edge of the periphery of the liquid crystal writing film, the calculation can be simplified; and the ultrasonic receivers can also be arranged at set locations outside the liquid crystal writing film, for example, at set positions outside the liquid crystal blackboard. According to the geometrical relationship, the location information of any point in the liquid crystal writing film can be obtained by the above-described coordinate positioning principle according to the geometrical relationship.

It should be noted that, in this embodiment, the shape, structure, and size of the erased object are not limited, and only the ultrasonic transmitting device is provided thereon.

Embodiment 8

Based on the partial erasing liquid crystal writing film disclosed in embodiment 1 and embodiment 2, the present embodiment discloses a partial erasing infrared positioning system of a liquid crystal writing film, which is capable of accurately positioning a partial erasing location.

The partial erasing infrared positioning system of the liquid crystal writing film disclosed in some implementation manners includes: an infrared transmitting tube array and an infrared receiving tube array are respectively arranged around the liquid crystal writing film along a first direction; and an infrared transmitting tube array and an infrared receiving tube array are respectively arranged around the liquid crystal writing film along a second direction; and the relative location information of an obstacle on the liquid crystal writing film is determined according to a relative location of infrared receiving tubes 2 that do not receive infrared signals.

It should be noted that the surrounding of the liquid crystal writing film may refer to the edge of the liquid crystal writing film or the periphery of the liquid crystal writing film, as long as a writing region 3 of the liquid crystal writing film can be completely detected.

In addition, the surrounding of the liquid crystal writing film may also refer to being directly arranged at the outside of the liquid crystal writing film, for example, for the liquid crystal writing film on the blackboard, the infrared transmitting tube array and the infrared receiving tube array can be arranged at the outside of the blackboard, and the partial erasing positioning in the writing region 3 of the liquid crystal writing film can also be achieved by using the geometrical relationship.

The infrared transmitting tube arrays are respectively arranged on two peripheral adjacent edges of the liquid crystal writing film, and the receiving mode of an infrared transmitting tube 1 and an infrared receiving tube 2 is direct receiving. Corresponding infrared receiving tube arrays are respectively arranged on opposite edges of the two adjacent edges; and the infrared transmitting tube array and the infrared receiving tube array adopt a direct receiving mode, as shown in FIG. 23.

The numbers of the infrared transmitting tubes 1 and the infrared receiving tubes 2 arranged on the two opposite edges are the same, the numbers of the infrared transmitting tubes 1 or the infrared receiving tubes 2 arranged on the two adjacent edges can be the same or different, the diameters and the distances of the infrared transmitting tubes 1 and the infrared receiving tubes 2 are set, and as long as the numbers, the diameters and the distances of the infrared transmitting tubes 1 and the infrared receiving tubes 2 are determined, the size of a detecting region is relatively fixed.

Figure 23:
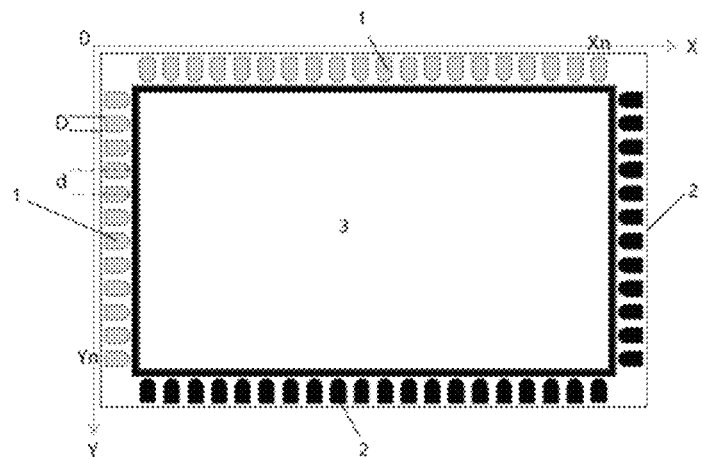
FIG. 23 is a schematic diagram of a partial erasing infrared positioning system of a liquid crystal writing film in embodiment 8.

In FIG. 23, the number of the transmitting tubes or the receiving tubes on the X direction is Xn, the number of the transmitting tubes or the receiving tubes on the Y direction is Yn, the diameters of the transmitting tube and the receiving tubes are D, and the center distance between the adjacent transmitting tubes or receiving tubes is d, and then the sizes of the detecting region on the X direction and the Y direction are respectively (Xn−1)*d+D and (Yn−1)*d+D.

In a normal state, the infrared transmitting tube array emits infrared rays, the infrared receiving tube array on the opposite edge receives infrared signals; when one or some of infrared receiving tubes 2 cannot receive the infrared signals, it indicates that an obstacle exists in the detecting region, and the relative location of the obstacle in the detecting region is deduced by calculating the relative location of the infrared receiving tubes 2 that cannot receive the infrared signals on the X direction and the Y direction.

Figure 24:
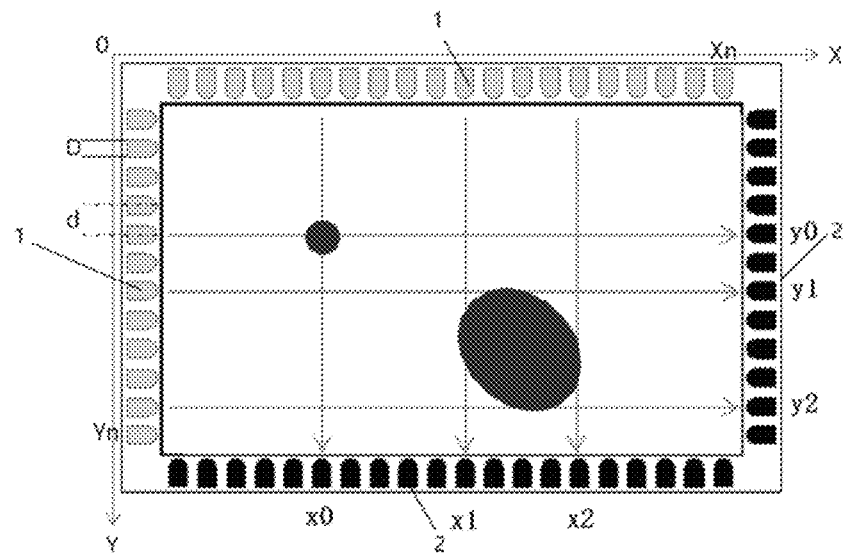
FIG. 24 is a first schematic diagram of a partial erasing infrared positioning device in embodiment 7.

The working principle of the partial erasing infrared positioning is as shown in FIG. 24. When the infrared receiving tubes 2 at the x0 and y0 location cannot receive the infrared signals, it indicates that a single-point obstacle exists at the relative position (x0, y0) coordinates in the detecting region, and the relative location information can be used as the positioning information of the obstacle; and if a plurality of infrared receiving tubes 2 from the x1 to x2 and y1 to y2 locations cannot receive the infrared signals, it indicates that an obstacle of which the length and width are respectively x2-x1 and y2-y1 exists in four point coordinates of the relative locations (x1, y1), (x1, y2), (x2, y1), (X2, y2) in the detecting region, and the information of the four relative location coordinates (x1, y1), (x1, y2), (x2, y1), (x2, y2) can be used as block positioning information of the obstacle.

Assuming that the coordinates of two vertex locations of a partial erasing board are (x1, y1), (x2, y2), and the resolutions of an infrared detection matrix are X max, Y max, partial erasing etching lines contain $X_L$ lines in total on the X direction and contains $Y_L$, lines in total on the Y direction, then the location range of the etching lines on the X direction corresponding to the partial erasing is from $$\frac{x_1}{X\max} * X_L \text{ to } \frac{x_2}{X\max} * X_L,$$

and the location range of the etching lines on the Y direction is from $$\frac{y_1}{Y\max} * Y_L \text{ to } \frac{y_2}{Y\max} * Y_L.$$

The positioning information of the obstacle detected by using the above principle can be used as eraser location information for processing.

In order to distinguish a writing pen from an eraser, the size or shape of the eraser is specialized, and cannot be the same as the size or the shape of the writing pen; writing using the writing pen or erasing using the eraser or an external interference signal is distinguished by judging the size or shape of the detected obstacle, so that the data loss caused by wrong erasing can be avoided effectively.

Figure 25:
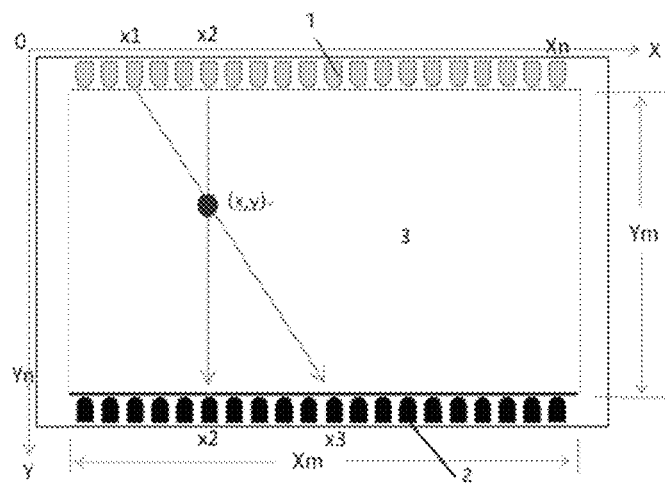
FIG. 25 is a second schematic diagram of the partial erasing infrared positioning device in embodiment 7.

The partial erasing infrared positioning system of the liquid crystal writing film disclosed in some other implementation manners adopts a positioning manner of infrared matrixes on both sides, as shown in FIG. 25, the infrared transmitting tube array and the infrared receiving tube array are respectively arranged on only two opposite sides around the writing film, and the receiving mode of the infrared transmitting tubes 1 and the infrared receiving tubes 2 is direct receiving. Herein, the meaning of the surrounding of the writing film is the same as that in embodiment 1.

In this positioning manner, the infrared transmitting tubes 1 and the receiving tubes respectively work in the direct receiving mode and an oblique receiving mode at a set angle to perform the detection; herein, it should be noted that the emission angle of the infrared transmitting tube 1 can be set as needed, for example, 15 degrees, 30 degrees, 45 degrees, 60 degrees, 90 degrees, 120 degrees or 180 degrees or the like.

When the infrared transmitting tubes 1 and the receiving tubes work in the direct receiving mode, referring to FIG. 25, when there is an obstacle at the (x, y) location, the x2 location of the infrared receiving tube 2 cannot receive the infrared signal, therefore the x2 location of the obstacle on the X direction can be determined, however, at this time, the specific location of the obstacle on the Y direction cannot be determined, then the infrared transmitting tubes 1 and the receiving tubes automatically switch to the oblique receiving mode at the set angle; at this time, if the receiving tube at an x3 location cannot receive the infrared signal, it can be known that the infrared signal of the infrared transmitting tube 1 at x1 cannot be received at the moment through the fixed angle, therefore:

$$\frac{x2-x1}{y} = \frac{x3-x2}{Ym-y};$$

wherein Ym represents the distance between the infrared transmitting tube array and the receiving tube array;

it can be obtained from the formula that:

$$y = \frac{(x2-x1)*Ym}{x3-x1};$$

then the specific location coordinates of the obstacle are (x2, y), that is, $$\left(x2, \frac{(x2-x1)*Ym}{x3-x1}\right).$$

Similarly, by determining the relative location information of a plurality of single points, the relative location of the large-sized eraser can also be determined.

In order to distinguish the writing pen from the eraser, the size or shape of the eraser is specialized, and cannot be the same as the size or shape of the writing pen, writing using the writing pen or erasing using the eraser or the external interference signal is distinguished by judging the size or shape of the detected obstacle, so that the data loss caused by wrong erasing can be avoided effectively.

Embodiment 9

Based on the partial erasing liquid crystal writing film disclosed in embodiment 1 and embodiment 2, the present embodiment discloses a partial erasing infrared positioning system of a liquid crystal writing film, which is capable of accurately positioning a partial erasing location. The specific structure includes at least one image positioning device, and the image positioning device includes at least one camera and a processor connected with the camera; the camera collects image information of an erasing object appearing in a writing region and transmits the image information to the processor, and the processor positions a relative location of the erasing object on the liquid crystal writing film according to the image information, and determines partial erasing location information. A partial erasing region on the liquid crystal writing film is determined according to the partial erasing location information to perform erasing on the partial erasing region.

It should be noted that the processor can adopt any one of the existing central controllers or microcontrollers or single chip microcomputers. For example, the STC51 series of microcontrollers can be selected without improvement of hardware structures and software programs.

Figure 26:
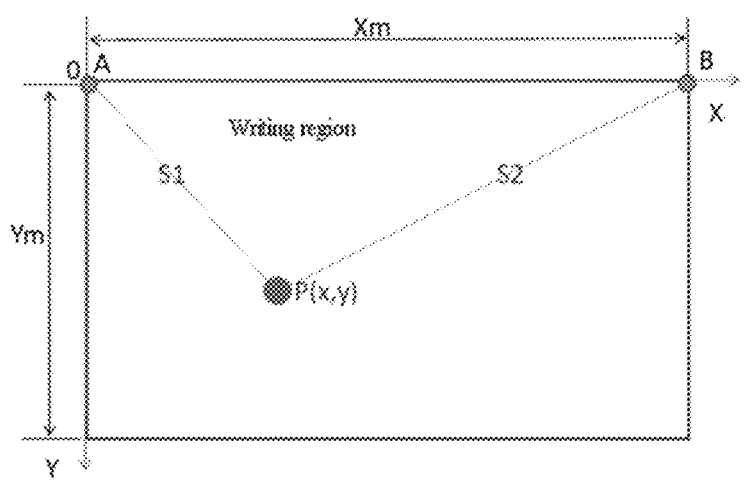
FIG. 26 is a schematic diagram of a partial erasing influence positioning system of a liquid crystal writing film in embodiment 9.

The image positioning device is arranged at the edge of the liquid crystal writing film. As shown in FIG. 26, a camera is respectively installed on end points A and B of the same edge in which the maximum writing region sizes are respectively Xm and Ym on the liquid crystal writing film, each camera can continuously capture image data in the writing region and perform comparison to obtain a relative distance location of the object in the writing region, for example, the coordinates of the point P in FIG. 1 are (x, y), and the cameras A and B respectively capture the images of the object with and without the point P and perform comparison to automatically calculate the distances S1 and S2 between the two cameras A and B to the point P, then:

$$\begin{cases} x^2 + y^2 = S1^2 \\ (Xm - x)^2 + y^2 = S2^2 \end{cases};$$

it can be derived that:

$$x = \frac{S1^2 + Xm^2 - S2^2}{2Xm};$$
$$y = \sqrt{S1^2 - x^2}.$$

Since the cameras are arranged at the edge locations of the writing film, on the one hand, the area of the writing film frame can be effectively reduced, and the requirements of users for the frameless liquid crystal writing device can be satisfied; and on the other hand, the partial erasing positioning device and the liquid crystal writing film can be integrally arranged, thereby being convenient to carry.

Of course, the cameras can also be arranged at the periphery of the liquid crystal writing film, for example, at the frame of the writing board or the blackboard or the drawing board. At this time, by adopting the above calculation principle, the cameras are respectively arranged at two end points of the frame, so that the calculation process can be simplified.

Alternatively, the cameras are arranged at any locations at the outside of the liquid crystal writing film capable of collecting the image information of the writing region of the liquid crystal writing film. For example, for a blackboard with the liquid crystal writing film, the cameras can be arranged at any locations in a classroom, the number of the cameras is not limited, but in general, one camera can meet the requirements.

In this manner, the image information of the writing region of the liquid crystal writing film is collected by the cameras, the image information of the erasing object is recognized by the image recognition technology, and then the image location is positioned by using the image positioning technology. The image positioning and image recognition technologies involved can adopt mature algorithms at present, such as an image recognition algorithm based on a neural network and a positioning method based on image feature points, etc.

Embodiment 10

In combination with the recordings of the technical solutions of the present disclosure in embodiment 1 to embodiment 9, specific application products that can be applied in the above technical solutions are disclosed, including: light energy writing boards, light energy liquid crystal writing boards, light energy large liquid crystal writing blackboards, light energy dustless writing boards, light energy portable blackboards, electronic drawing boards, LCD electronic writing boards, electronic handwriting boards, electronic note notebooks, graffiti boards, kids handwriting boards, kids graffiti drawing boards, eraser function sketching boards, liquid crystal electronic drawing boards or color liquid crystal handwriting boards or other related products known to those skilled in the art.

The above descriptions are only preferred embodiments of the present disclosure and are not intended to limit the present disclosure, and various changes and modifications may be made to the present disclosure for those skilled in the art. Any modifications, equivalent substitutions, improvements and the like made within the spirit and principle of the present disclosure should be included in the protection scope of the present application.

The invention claimed is:

1. A partial erasing method of a liquid crystal writing film that comprises a first conductive layer, a liquid crystal layer, and a second conductive layer arranged in sequence, wherein:

one of the first conductive layer and the second conductive layer is divided into two or more conductive regions that are insulated from each other; and a common overlapping part of the conductive regions, the liquid crystal layer, and the undivided conductive layer is an erasable region, or the first conductive layer and the second conductive layer are both divided into two or more conductive regions that are insulated from each other; and a spatial overlapping part of the conductive regions of the first conductive layer and the second conductive layer forms the erasable region with a liquid crystal layer region corresponding to the part together, the method comprising:

in a case in which one of the first conductive layer and the second conductive layer is divided:

applying a voltage A to the conductive region of the divided conductive layer that covers the partial erasing region; and applying a voltage B to the other conductive layer, wherein the voltage A and the voltage B form an erasing electric field at a spatial overlapping location between the conductive region of the divided conductive layer that covers the partial erasing region and the other conductive layer, so as to achieve the partial erasing;

in a case in which the first conductive layer and the second conductive layer are both divided:

applying the voltage A to the conductive region of the first conductive layer that covers the partial erasing region;

applying the voltage B to the conductive region of the second conductive layer that covers the partial erasing region, wherein the voltage A and the voltage B form the erasing electric field at the spatial overlapping location between the conductive regions, so as to achieve the partial erasing, and an absolute value of a difference value between the voltage A and the voltage B is greater than zero; and applying a compensation voltage to the conductive region set at the outside of the respective conductive regions of the two conductive layers that cover the partial erasing regions, so that the electric field formed by the voltage difference between the conductive regions set at the outside of the partial erasing regions on the two conductive layers cannot cause disappearance of liquid crystal indentation.

2. The partial erasing method of the liquid crystal writing film according to claim 1, wherein applying the compensation voltage includes applying a voltage C to the conductive regions set at the outside of the respective conductive regions of the two conductive layers that cover the partial erasing regions, wherein with the voltage B as a reference value, the voltage A, the voltage B, and the voltage C satisfy the following relationships:

|voltage $A$–voltage $B$|>|voltage $A$–voltage $C$|;

|voltage $A$–voltage $B$|>|voltage $C$–voltage $B$|; and

|voltage $A$–voltage $B$|=|voltage $C$–voltage $B$|*2.

3. The partial erasing method of the liquid crystal writing film according to claim 1, wherein applying the compensation voltage includes applying two or more compensation voltages to the conductive regions set at the outside of the respective conductive regions of the two conductive layers that cover the partial erasing regions, so that the electric field formed by the voltage difference between the conductive regions set at the outside of the partial erasing regions on the two conductive layers cannot cause shallowness or disappearance of the liquid crystal indentation visible to naked eyes.

4. The partial erasing method of the liquid crystal writing film according to claim 3, wherein applying the two or more compensation voltages includes:

applying a voltage D to the conductive region set at the outside of the conductive region on the first conductive layer that covers the partial erasing region, and applying a voltage E to the conductive region set at the outside of the conductive region on the second conductive layer that covers the partial erasing region;

wherein with the voltage B as a reference value, the voltage A, the voltage B, the voltage D, and the voltage E satisfy the following relationships:

|voltage $A$–voltage $B$|>|voltage $D$–voltage $B$|

|voltage $A$–voltage $B$|>|voltage $A$–voltage $E$|

|voltage $A$–voltage $B$|>|voltage $D$–voltage $E$|

|voltage $A$–voltage $B$|=|voltage $D$–voltage $B$|*3

|voltage $E$–voltage $B$|=|voltage $D$–voltage $B$|*2.

5. A partial erasing method of a liquid crystal writing film that comprises a first conductive layer, a liquid crystal layer, and a second conductive layer arranged in sequence, wherein the first conductive layer and the second conductive layer are respectively divided into two or more conductive regions that are insulated from each other; and a spatial overlapping part of the conductive regions of the first conductive layer and the second conductive layer forms an erasable region with a liquid crystal layer region corresponding to the part together, the method comprising:

applying a first voltage to the conductive region of the first conductive layer that covers the partial erasing region; and applying a second voltage to the conductive region of the second conductive layer that covers the partial erasing region;

wherein:

the remaining conductive regions are in a high impedance state; and the first voltage and the second voltage form an erasing electric field at a spatial overlapping location of the two conductive regions so as to achieve the partial erasing; or, applying a first voltage to the conductive region of the first conductive layer that covers a first partial erasing region, and to the conductive region of the second conductive layer that covers the second partial erasing region;

applying a second voltage to the conductive region of the second conductive layer that covers the first partial erasing region, and to the conductive region of the first conductive layer that covers a second partial erasing region;

wherein:

the remaining conductive regions are in a high impedance state;

the first partial erasing region and the second partial erasing region are diagonally adjacent to each other; and the first voltage and the second voltage form an erasing electric field at a spatial overlapping location of the conductive regions on the two conductive layers so as to achieve the partial erasing of the diagonal adjacent regions.

6. The partial erasing method of the liquid crystal writing film according to claim 5, wherein:

the conductive region is connected with a multi-voltage output circuit, and the multi-voltage output circuit is configured to apply the first voltage, the second voltage, or the high impedance state to the conductive region as needed; and the first voltage is at least greater than the voltage required to completely erase the handwriting, and the second voltage is a zero voltage.

* * * * *